(12) United States Patent
Schein et al.

(10) Patent No.: US 9,863,136 B2
(45) Date of Patent: Jan. 9, 2018

(54) ARCHIMEDEAN CAGES, POLYHEDRA, AND NANOTUBE STRUCTURES AND METHODS

(71) Applicant: The Regents of the University of California, Oakland, CA (US)

(72) Inventors: Stanley Jay Schein, Santa Monica, CA (US); James Maurice Gayed, Beverly Hills, CA (US); Alexander James Yeh, Orinda, CA (US)

(73) Assignee: The Regents of the University of California, Oakland, CA (US)

( * ) Notice: Subject to any disclaimer, the term of this patent is extended or adjusted under 35 U.S.C. 154(b) by 197 days.

(21) Appl. No.: 14/799,478

(22) Filed: Jul. 14, 2015

(65) Prior Publication Data

US 2015/0315775 A1    Nov. 5, 2015

Related U.S. Application Data

(63) Continuation-in-part of application No. 14/446,149, filed on Jul. 29, 2014, now Pat. No. 9,720,881.

(60) Provisional application No. 61/861,960, filed on Aug. 2, 2013, provisional application No. 62/024,381, filed on Jul. 14, 2014.

(51) Int. Cl.
| | |
|---|---|
| *E04B 7/18* | (2006.01) |
| *E04C 2/30* | (2006.01) |
| *E04B 1/32* | (2006.01) |
| *G06F 17/10* | (2006.01) |
| *E04B 1/00* | (2006.01) |

(52) U.S. Cl.
CPC ............ *E04B 1/3211* (2013.01); *G06F 17/10* (2013.01); *E04B 2001/0061* (2013.01); *E04B 2001/0069* (2013.01); *E04B 2001/3223* (2013.01); *E04B 2001/3294* (2013.01)

(58) Field of Classification Search
CPC .......... E04C 2/30; E04C 2/405; E04B 1/3211; E04B 2001/0061; E04B 2001/3223; E04B 2001/3282; E04B 7/18; E04B 2001/3241; E04B 2001/3247; E04B 2001/327
USPC ...................... 52/80.1, 80.2, 81.1, 81.2, 81.4
See application file for complete search history.

(56) References Cited

U.S. PATENT DOCUMENTS

| | | | | |
|---|---|---|---|---|
| 3,203,144 | A * | 8/1965 | Buckminster | ......... E04B 1/3211 52/537 |
| 4,474,376 | A * | 10/1984 | Gustafson | ............. A63F 9/0838 273/153 S |
| 4,522,401 | A * | 6/1985 | Gustafson | ............. A63F 9/0838 273/153 S |

(Continued)

*Primary Examiner* — Phi A
(74) *Attorney, Agent, or Firm* — Christensen O'Connor Johnson Kindness PLLC

(57) ABSTRACT

A method for designing a structure includes selecting an initial cage, defining a secondary cage by positioning a plurality of tiles, reduced tiles, or larger patches obtained or derived from a selected one of the uniform Archimedean tilings over the faces of the initial cage, resizing edges of the secondary cage such the cage is equilateral, and planarizing the cage faces. In an embodiment the patch comprising a network of edges and vertices from a uniform tiling decorates the faces of a polyhedron to define a non-polyhedral cage that is transformed by planarizing the faces. In an embodiment the secondary cage comprises tiles derived from an Archimedean tiling that decorate faces of the initial cage comprising a polyhedron. In an embodiment the secondary cages resemble a nanotube.

4 Claims, 19 Drawing Sheets

410

3.6.3.6

(56) References Cited

U.S. PATENT DOCUMENTS

| | | | |
|---|---|---|---|
| 4,611,441 A | 9/1986 | Wickens | |
| 4,679,361 A * | 7/1987 | Yacoe | E04B 1/3211 52/81.1 |
| 4,729,197 A | 3/1988 | Miller | |
| 4,830,378 A * | 5/1989 | Aoyama | A63B 37/0004 473/383 |
| 6,652,347 B1 * | 11/2003 | Stevkovski | A63F 9/0838 434/211 |
| 8,347,561 B2 | 1/2013 | Howe | |
| 2002/0078635 A1 * | 6/2002 | Monson | E04B 1/3211 52/81.1 |
| 2008/0070727 A1 * | 3/2008 | Avis | A63B 41/08 473/604 |
| 2009/0113815 A1 * | 5/2009 | Woodcock | E04B 1/3211 52/81.1 |
| 2012/0204496 A1 * | 8/2012 | McSweeney | E04B 1/3211 52/80.1 |
| 2014/0200099 A1 * | 7/2014 | Aoyama | A63B 37/0007 473/383 |
| 2015/0182812 A1 * | 7/2015 | Berggren | A63B 41/00 29/899.1 |

* cited by examiner 4.8.8

ARCHIMEDEAN CAGES, POLYHEDRA, AND NANOTUBE STRUCTURES AND METHODS

CROSS-REFERENCES TO RELATED APPLICATIONS

This application claims the benefit of Provisional Application No. 62/024,381, filed Jul. 14, 2014. This application is also a continuation-in-part of application Ser. No. 14/446,149, filed Jul. 29, 2014, which claims the benefit of Provisional Application No. 61/861,960, filed Aug. 2, 2013, the entire disclosures of said applications are hereby incorporated by reference herein.

BACKGROUND

Description and classification of geometric forms have occupied mathematical thinkers since ancient times. The Greeks discovered the five Platonic polyhedra (tetrahedron, cube or hexahedron, octahedron, dodecahedron, and icosahedron) and the thirteen Archimedean polyhedra, all with regular (i.e., equiangular and equilateral) faces. Kepler, who rediscovered the Archimedean polyhedra, discovered two rhombic polyhedra, including the rhombic dodecahedron that resembles ferritin cages. These three classes of polyhedra represent all of the equilateral convex polyhedra with polyhedral symmetry, i.e., icosahedral, octahedral and tetrahedral symmetry. For example, none of the well-known face-regular Johnson solids have polyhedral symmetry.

In a paper titled "A class of multi-symmetric polyhedral," published in the Tohoku Mathematical Journal 43:104-108 (1937), which is hereby incorporated by reference, the mathematician Michael Goldberg disclosed a novel method for constructing cages with tetrahedral, octahedral, and icosahedral symmetry.

A method for constructing a Goldberg cage is illustrated in FIGS. 1A-1F. First a "Goldberg triangle" is constructed or selected. For example, an equilateral triangle is drawn or positioned on a tiling of hexagons with the vertices of the triangle on the centers of hexagons in the tiling. Examples of suitable Goldberg triangles are shown in FIGS. 1A-1C, wherein the vertices from the tiling that are enclosed by the triangle are shown with a solid circle and vertices that the triangle overlies are shown with a half-filled circle. One edge of the triangle is herein referred to as the "base line segment."

In general, the base line segment spans h tiles in the horizontal direction (in FIGS. 1A-1C) and k tiles in a direction 60 degrees from horizontal. For example, in the three examples shown in FIG. 1A the base line segment spans h=1, h=2, and h=3 tiles respectively in the horizontal direction, and zero tiles in the 60 degrees direction. In FIG. 1B (left) the base line segment spans h=1 tile in the horizontal direction and k=1 tile in the 60 degree direction. In FIG. 1B (right) the base line segment spans h=2 tiles in the horizontal direction and k=2 tiles in the 60 degree direction. In FIG. 1C (left) the base line segment spans h=2 tiles in the horizontal direction, and k=1 tile in the 60 degree direction. In FIG. 1C (right) the base line segment spans h=3 tiles in the horizontal direction, and k=1 tile in the 60 degree direction.

A Goldberg triangle encloses T vertices (vertices the triangle overlies are counted as ½ an enclosed vertex) as shown in Eq. 1, where:

$$T = h^2 + hk + k^2 \quad (1)$$

In FIGS. 1A-1C the figures are labeled with the number of enclosed vertices, T and the (h, k) parameters. Goldberg triangles can be grouped into three different types: (i) the (h,0) group, i.e., k=0 (exemplary embodiments shown in FIG. 1A for T=1, 4 and 9), (ii) the (h=k) group (exemplary embodiments shown in FIG. 1B for T=3 and 12), and (h≠k) the (hA) group (exemplary embodiments shown in FIG. 1C, with T=7 and 13). A triangular patch is then generated from the constructed triangle. For example, FIG. 1D shows the triangular patch 80 for the Goldberg triangle having T=9 vertices with (h,k)=(3,0).

Each triangular facet of a regular tetrahedron, octahedron, or icosahedron is then decorated with the selected Goldberg triangle. FIG. 1E (left) shows the Goldberg triangle 80 on the faces of a tetrahedron 82, FIG. 1E (center) shows the Goldberg triangle 80 on the faces of an octahedron 84, and FIG. 1E (right) shows the Goldberg triangle 80 on the faces of an icosahedron 86. Finally edges 81 are added that connect vertices across the boundaries of the faces, as illustrated for each of these polyhedral in FIG. 1F.

The resulting tetrahedral cage has 4 T trivalent vertices, sixteen 6gonal faces, and four triangular faces. The resulting octahedral cage has 8 T trivalent vertices, thirty-two 6gonal faces, and six square corner faces. The resulting icosahedral cage has 20 T trivalent vertices, eighty hexagonal faces, and twelve pentagonal faces. However, with unequal edge lengths, these cages are not equilateral. With nonplanar faces these cages are not polyhedra and thus not convex.

For T=1 and T=3 we transform these cages such that all edge lengths are equal and all interior angles in the hexagons are equal. For T=1 this method produces three of the Platonic solids: the tetrahedron, the cube, and the dodecahedron. For T=3, this method produces three of the Archimedean solids: the truncated tetrahedron, the truncated octahedron, and the truncated icosahedron. These cages are geometrically polyhedral because their faces are planar. They are also convex.

Can similar symmetric convex equilateral polyhedra be created from Goldberg triangles for T>3? The present inventors have proven that no such polyhedra are possible if the transformation also requires equiangularity. Even if the transformation does not enforce equiangularity, the resulting "merely equilateral" cages would typically have nonplanar hexagonal faces, and therefore are not polyhedral. Moreover, the nonplanar hexagons defined by the cages are either "boat" shaped or "chair" shaped, and therefore the cages are not convex.

The present inventors found that the difference—convex polyhedral cages with planar hexagons for T=1 and T=3, but non-polyhedral cages with nonplanar faces for T>3—is due to the presence of edges with dihedral angle discrepancy ("DAD"), which is discussed in more detail herein. However, surprisingly the inventors discovered that it is possible to null all of the DADs and thus to create an entirely new class of equilateral convex polyhedra with polyhedral symmetry that we call "Goldberg polyhedra."

The resulting Goldberg polyhedra and corresponding Goldberg cages may be used, for example, to construct an efficient and nearly spherical framework or dome for enclosing space wherein the edges or struts of the framework are of equal length. Near-spherical convex, equilateral polyhedral structures, and methods for designing such structures, are disclosed that are suitable for enclosing a space, including, for example, a living space, a storage space, a utility space, or the like. The new equilateral cages and/or Goldberg polyhedra may also be used for other purposes such as providing nearly spherical (e.g., hemispherical, spherical sections, or the like) constructs that may be used as supports. An advantage of such structures is the equilaterality. For example, an equilateral cage will have struts that are all of equal length, so the struts may be fully interchangeable, thereby simplifying manufacture and assembly.

The present disclosure builds on and extends the disclosure and inventions in U.S. Provisional Patent Application No. 61/861,960, filed on Aug. 2, 2013, and also builds on and extends the disclosure in Schein, S., and J. M. Gayed, "Fourth class of convex equilateral polyhedron with polyhedral symmetry related to fullerenes and viruses." *Proceedings of the National Academy of Sciences of the United States of America* (2014), which is hereby incorporated by reference in its entirety.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for constructing a convex equilateral structure includes: (i) selecting a patch from a uniform tiling having 4fold or 6fold symmetry, (ii) defining a cage corresponding to the edges and vertices defined by the selected patch applied to the faces of a polyhedron selected from an icosahedron, an octahedron, a tetrahedron, a truncated tetrahedron, and a cube, with patches connected across adjacent faces of the polyhedron; (iii) resizing the edges to have uniform length such that the cage defines a plurality of modified polygonal faces, (iv) planarizing the modified polygonal faces throughout the cage to define a set of interior angles for the polygonal faces, and (v) constructing a convex equilateral cage structure comprising interconnected members with edges oriented according to the set of interior angles or spanning a set of vertex coordinates.

In an embodiment the interconnected members comprise elongate struts having a uniform length, and the convex equilateral structure comprises a cage.

In an embodiment the interconnected members comprise equilateral planar members, and the convex equilateral structure comprises an enclosure.

In an embodiment the uniform tiling comprises an Archimedean tiling.

In an embodiment the uniform tiling comprises a tiling having 4fold symmetry, the patch comprises a square patch, and the polyhedron comprises a cube.

In an embodiment the uniform tiling comprises a tiling having 6fold symmetry, the patch comprises a triangular patch, and the polyhedron comprises an icosahedron, an octahedron, an octahedron, or a tetrahedron.

In an embodiment the uniform tiling comprises a compound tiling having a hexagonal portion and a triangular portion, and the polyhedron comprises a truncated tetrahedron.

In an embodiment the set of interior angles are solved for by determining the set of interior angles that produce a zero dihedral angle discrepancy across edges throughout the cage.

In an embodiment the set of vertex coordinates are solved for by determining the set of vertex coordinates that produce a zero dihedral angle within faces throughout the cage.

In an embodiment the step of constructing the structure comprising interconnecting a plurality of elongate struts.

In an embodiment the convex equilateral structure comprises a dome-shaped structure.

A method for designing a dome structure comprises defining at least one patch comprising a set of edges and vertices that correspond to a contiguous section of a uniform convex tiling, defining a cage corresponding to (i) a plurality of the at least one patch disposed on the faces of a selected polyhedron, and (ii) joining patches from the plurality of patches across adjacent faces of the selected polyhedron, the cage defining a plurality of polygonal faces defining a set of internal angles, solving for new values for the sets of internal angles or vertex coordinates that produce a polyhedral cage, and constructing a corresponding dome structure.

In an embodiment the edges of the cage are transformed to have the same length prior to solving for the new values for the set of internal angles.

In an embodiment the dome structure comprises a plurality of struts that are joined to define a cage corresponding to the dome structure.

In an embodiment the selected polyhedron is one of an tetrahedron, an octahedron, an icosahedron, and a cube.

In an embodiment the uniform tiling is a regular or semi-regular tiling, also called a Platonic or Archimedean tiling.

In an embodiment the uniform tiling is a compound tiling have a hexagonal portion and a triangular portion, and the polyhedron is a truncated tetrahedron.

A method for defining a convex equilateral cage includes (i) selecting an initial cage having a plurality of edges extending from vertices, wherein the edges define a plurality of faces, (ii) defining a secondary cage having edges and vertices from a plurality of tiles, reduced tiles, and/or larger patches obtained or derived from a selected one of the uniform Archimedean tilings, wherein the plurality of tiles, reduced tiles, or patches are positioned over the plurality of faces of the initial cage, (iii) resizing the edges of the secondary cage to be equilateral, (iv) solving for a set of interior angles that produce planar polygonal faces, and (v) constructing a convex equilateral cage structure comprising members defining equilateral edges oriented according to the set of interior angles or spanning a set of vertex coordinates.

In an embodiment the initial cage comprises one of a tetrahedral cage, an octahedral cage, an icosahedral cage and a hexahedral cage.

In an embodiment the plurality of tiles, reduced tiles, or patches comprises Archimedean tiles obtained from an Archimedean uniform tiling.

In an embodiment the plurality of tiles, reduced tiles, or patches consist of a plurality of tiles from a selected Archimedean uniform tiling and reduced tiles derived from the tiles from the selected Archimedean uniform tiling.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A-1C illustrate the various types of Goldberg triangles that comprise an equilateral triangle with corners disposed on the centers of selected hexagons in a hexagonal tiling, wherein FIG. 1A illustrates three (h,0) Goldberg triangles, FIG. 1B illustrates two (h=k) Goldberg triangles, and FIG. 1C illustrates two (h≠k) Goldberg triangles;

FIGS. 7A-9C illustrate uniform tilings of the Euclidean plane and several Goldberg Triangular patches ("Goldberg Triangles" or "Triangles" with an uppercase T) and Goldberg Square patches ("Goldberg Squares" or "Squares" with an uppercase S) drawn over the tilings, wherein:

FIGS. 7A and 7B illustrate two of the Platonic tilings, a subset of the uniform tilings: (A) 6.6.6 composed of hexagons; and (B) 4.4.4.4 composed of squares. The corners of Goldberg Triangles are centered over hexagons in the 6.6.6 tiling. The achiral (with mirror symmetry) Triangles shown have T number and indices (h,k) of 1(1,0), 3(1,1), 4(2,0), and 12(2,2). The chiral (with no mirror symmetry) Triangle has T number and indices 7(2,1). The number of vertices in the Triangle, T, may be computed from $T=h^2+hk+k^2$. The corners of Goldberg Squares, representing the same indices (h,k), are centered over squares in the 4.4.4.4 tiling. These Square patches have $S=h^2+k^2$ vertices;

FIGS. 8A-8E illustrate the five of 6fold-Archimedean tilings of the eight Archimedean tilings, wherein FIG. 8A shows the 3.4.6.4 tiling, FIG. 8B shows the 3.6.3.6 tiling, FIG. 8C shows the 3.12.12 tiling, FIG. 8D shows the 4.6.12 tiling, and FIG. 8E shows the 3.3.3.3.6 tiling, all of which are "uniform" (having a single type of vertex), and have hexagonal or 12-gonal faces with 6fold rotational symmetry. Exemplary Goldberg Triangles (corresponding to those shown in FIG. 7A) are shown with corners centered over 6fold faces. For the chiral 3.3.3.3.6 tiling, two different chiral 7(1,2) Goldberg Triangles are shown. These 6fold Archimedean Goldberg Triangles have more vertices than the Goldberg 6.6.6 Triangles by the factors 3, 1.5, 3, 6 and 3, respectively;

FIGS. 9A-9C illustrate the two 4fold-Archimedean tilings of the eight Archimedean tilings with exemplary Goldberg Squares, wherein FIGS. 9A and 9B show the 4.8.8 and FIG. 9C shows the 3.3.4.3.4 tiling, both achiral, have 4gons with 4fold rotational symmetry. The 4.8.8 tiling, (called 8.8.4 in FIG. 9B) has 8gons with 4fold rotational symmetry. In FIGS. 9A and 9C the corners of Goldberg Squares are centered over 4gons. In FIG. 9B the corners of Goldberg Squares are centered over 8gons. The achiral Squares shown here have S number and indices S(h,k) of 1(1,0), 3(1,1), 4(2,0), 12(2,2). The chiral Square has S number and indices 5(2,1). These 4fold Goldberg 4.8.8, 8.8.4 and 3.3.4.3.4 Squares contain more vertices than the Goldberg 4.4.4.4 Squares by the factors 4, 4 and 4 respectively;

FIGS. 10A-10L illustrate the five icosahedral 6fold-Archimedean Goldberg polyhedra (3.6.3.6; 3.4.6.4; 4.6.12; 3.12.12; and 3.3.3.3.6) corresponding to the icosahedral fullerene (6.6.6) (FIGS. 10A and 10G) with T number and indices 3(1,1), the last also known as the truncated icosahedron, corresponding approximately to the $C_{60}$ buckyball, wherein:

FIGS. 10A-10F show Schlegel diagrams for the six structures; and

FIGS. 10G-10L show all but the chiral 3.6.6.6.6 polyhedra with front halves obscuring back halves;

FIGS. 11A-11E illustrate the Fowler and Schein-Gayed-Yeh (SGY) constructions of tetrahedral ($T_d$) fullerenes, wherein:

FIG. 11A illustrates that the Schein-Gayed-Yeh (SGY) construction of a particular subset of $T_d$ fullerenes requires four regular Hexagonal patches—each containing a large equilateral Triangular patch and three isosceles Triangular patches—and four adjacent (small equilateral) Triangular patches cut out of a 6.6.6 tiling. Several of these paired (Hexagonal+small Equilateral Triangular) patches are shown in two series, one (upper) with the central large equilateral triangle with indices 3,0; 6,0; etc., the other (lower) with indices 1,1; 2,2; 3,3, etc.;

FIG. 11B illustrates the truncated tetrahedron, which has four regular hexagons and four equilateral triangles;

FIG. 11C illustrates the Schlegel diagram and FIG. 11D illustrates the corresponding 3D cage with 84 vertices for the upper left construction in FIG. 11A, which has large (3,0) equilateral triangles and small (1,1) equilateral triangles;

FIG. 11E illustrates that the Fowler construction creates a tetrahedral fullerene from four building blocks, each with one large equilateral triangle, three scalene triangles, and one small equilateral triangle, the last shown divided into thirds;

FIGS. 15A-15C illustrate square tilings and tiles, wherein a 4.4.4.4 (square) tiling overlies 4fold-Archimedean tilings with 4fold faces (4.8.8 with corners over 4fold axes of 4gons, 4.8.8 with corners over 4fold axes of 8gons—here renamed 8.8.4—and 3.3.4.3.4 with corners over 4fold axes of 4gons), and a corresponding isolated square 4.8.8, 8.8.4 and 3.3.4.3.4 tile for each tiling;

FIGS. 17A-17B illustrate rolling up tilings into a nanotube, wherein:

FIG. 17A illustrates an indexing scheme for three types of 6.6.6 nanotube, zigzag (n,0), armchair (n,n) and chiral (n,m), with the circumference C described by n units in the a1 direction and m units in the a2 direction; and FIG. 17B illustrates an indexing scheme for three types of 4.4.4.4 nanotube, (n,0), (n,n) and (n,m), with the circumference C described by n units in the a1 direction and m units in the a2 direction. Examples of the (n,0) and (n,n) nanotubes are shown.

DETAILED DESCRIPTION

I. Dihedral Angle Discrepancy (DAD)

Figure 2A:
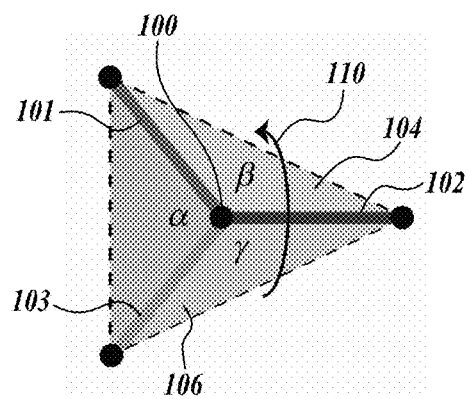
FIG. 2A illustrates the definition of a dihedral angle.

To understand dihedral angle discrepancy, consider the trivalent vertex 100 shown in FIG. 2A, wherein the vertex 100 is defined by three edges 101, 102, 103 that are not coplanar. In FIG. 2A the dihedral angle (DA) 110 about edge 102 is the angle between the two flanking planes 104 and 106. Plane 104 is defined by edges 101 and 102, and plane 106 is defined by edges 103 and 102. For the trivalent vertex 100, the cosine of the DA 110 may be calculated from end-angle $\alpha$ and side angles $\beta$ and $\gamma$ as shown in Eq. 2:

$$\cos(DA) = \frac{\cos(\alpha) - \cos(\beta) \times \cos(\gamma)}{\sin(\beta) \times \sin(\gamma)} \quad (2)$$

It should be appreciated that in Eq. 2 the angles $\beta$ and $\gamma$ are interchangeable.

Figure 2B:
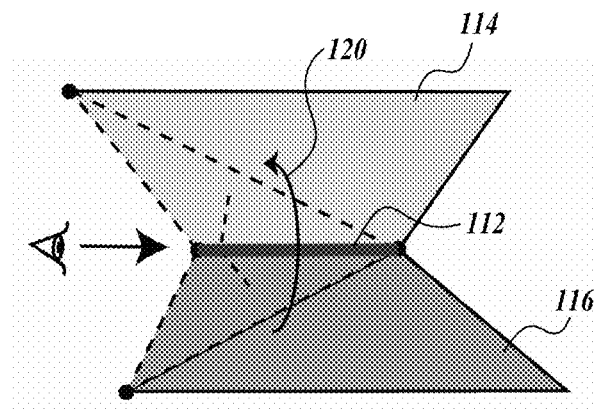
FIGS. 2B and 2C illustrate the dihedral angle about an edge joining two 4gons as viewed from the left end of the edge (FIG. 2B) and from the right end of the edge (FIG. 2C)
Figure 2C:
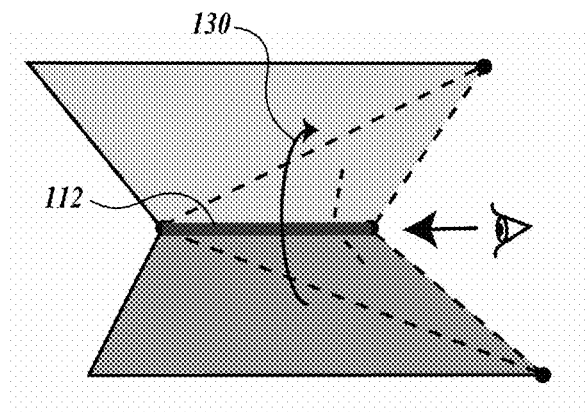

FIGS. 2B and 2C illustrate an edge 112 flanked by two 4gons 114 and 116. It will be clear from the FIGURES that if the 4gons 114 and 116 are planar, the dihedral angle 120 about the edge 112 when viewed from the left end (FIG. 2B) must be the same as the dihedral angle 130 when viewed from the right end (FIG. 2C). If the dihedral angles 120 and 130 are not the same, then one or both of the 4gons 114, 116 are not planar.

Figure 2D:
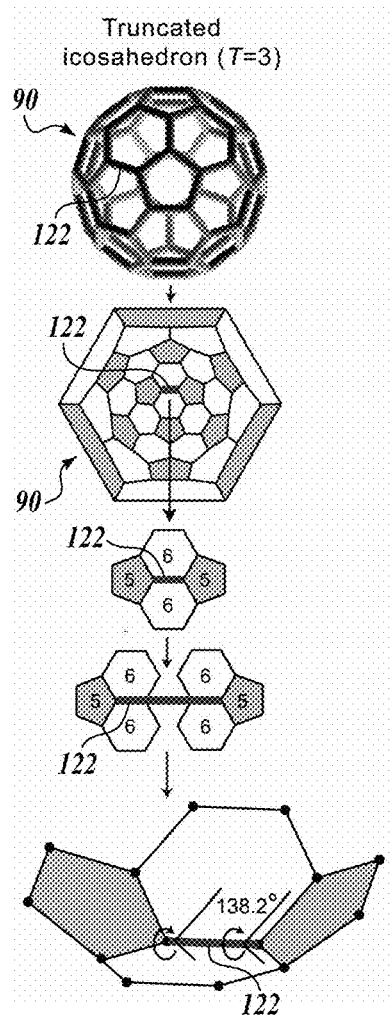
FIG. 2D illustrates the dihedral angles about either end of an edge joining two 566 vertices from a truncated icosahedron (in conventional nomenclature, a 566 vertex is a trivalent vertex formed by a 5gon and two 6gons arranged sequentially)

Now consider the truncated icosahedral cage 90 shown in FIG. 2D (top). A truncated icosahedron is an Archimedean solid having 12 regular (equilateral, equiangular) pentagonal faces and 20 regular hexagonal faces. An edge 122 extends from a 5gon at a 566 vertex ($\alpha$=108° for the regular pentagon, $\beta$=$\gamma$=120° for the regular hexagons) to another 5gon on the left side, also at a 566 vertex ($\alpha$=108°, $\beta$=$\gamma$=120°). Therefore, from Eq. 2 the edge 122 has dihedral angles that are the same 138.2° at both ends. (In conventional nomenclature, a 566 vertex is a trivalent vertex formed by a 5gon, and two 6gons arranged sequentially.)

Figure 2E:
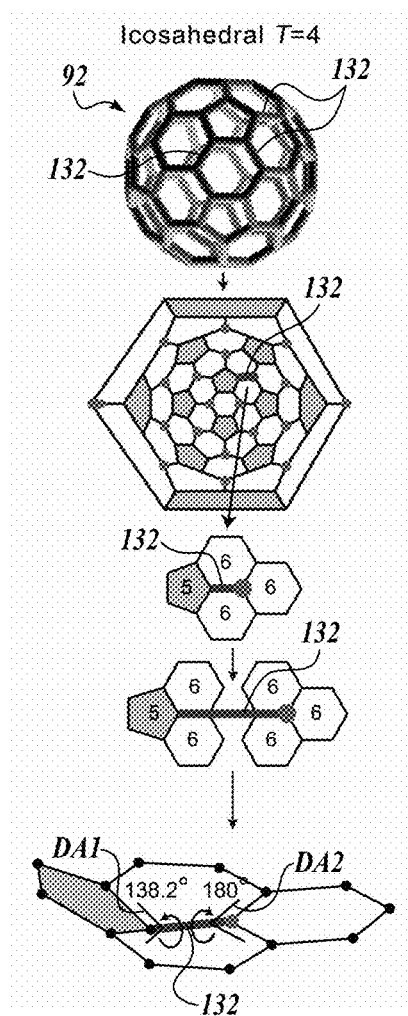
FIG. 2E illustrates the dihedral angles about either end of an edge joining a 566 vertex and a 666 vertex, wherein there is a dihedral angle discrepancy.

By contrast, in the icosahedral T=4 cage 92 shown in FIG. 2E (top) each of the spokes or edges 132 extending from any 5gon connects a 566 vertex to a 666 vertex. If the 6gons are regular and planar, they have internal angles of 120°. Therefore, according to Eq. 2 the dihedral angle DA1 about the 566 end (with $\alpha$=108°, $\beta$=$\gamma$=120°) is 138.2°, but the dihedral angle DA2 about the 666 end (with $\alpha$=$\beta$=$\gamma$=120°) is 180°. The difference or dihedral angle discrepancy (DAD) is 41.8°. Therefore, one or both of the 6gons flanking the edge 132 are nonplanar. With nonplanar faces flanking all of the 5gon spoke edges, this T=4 cage is not a polyhedron. (We note that nonplanar 6gons have internal angles that sum to less than 720° and cannot all be equal, but non-planar faces also mean that the cage is not polyhedral.)

All Goldberg cages with T≥4 have edges radiating from corner faces to 666 vertices. All Goldberg cages include edges having DADs, and are therefore non-polyhedral. This situation obtains for the achiral (h,0 and h=k) and chiral (h≠k) cages.

II. Nulling DADs

As discussed above, conventional Goldberg cages for T>3 produce nonplanar 6gons, and are therefore non-polyhedral. The present inventors have proven that the Goldberg cages cannot be transformed to produce polyhedral cages in any transformation that requires both equilaterality and equiangularity.

We then ask if a Goldberg cage for T>3 can be transformed into a convex polyhedral cage using a method that abandons the requirement for equiangularity in the 6gons, but maintains equilateral edges, i.e., is there a set of internal angles in the 6gons that would null the DADs about spoke edges and produce planar faces flanking those edges? Symmetry requires the corner faces—3gons, 4gons, or 5gons—to be regular and thus equiangular. For example, the DAD about the spoke edge 132 in FIG. 2E would be zero if dihedral angle (DA1) on the 566 end of the edge 132 were equal to the dihedral angle (DA2) on the 666 end of the edge 132:

$$DA1-DA2=0 \quad (3)$$

For example, if the internal angles are 60°, 135° and 135° at one end of the edge 132, and 90°, 90°, and 90° at the other end, both dihedral angles DA1 and DA2 would be 90° and the DAD would be zero. We note that the internal angle labels at either end of the edge (i.e., 566 and 666) are different, so the edge would still be a "DAD edge."

Our first challenge is to discover for cages with T≥4 whether it is possible to find a set of internal angles in the 6gons that null all of the DADs in a cage—including the spoke edges—and thus make all of the faces planar. Our second challenge is to determine those internal angles, or equivalently to determine the coordinate of all of the vertices that null the dihedral angles within the 6gons.

III. Labeling 6gons and Internal Angles

We begin by identifying each symmetry-equivalent 6gon in the Goldberg triangles. For example, in FIG. 3A a T=4 (2,0) Goldberg triangle 140 involves three 6gons 142. All of the three 6gons 142 are symmetry-equivalent, with angles "a" and "b" as indicated. The corner portions 144 define regular 3gon, 4gon, or 5gon, which are constrained to be regular (equilateral, equiangular) polygons. Therefore, the T=4 (2,0) Goldberg triangle 140 has one 6gon type 142, and one type of DAD edge 146.

Figure 3A:
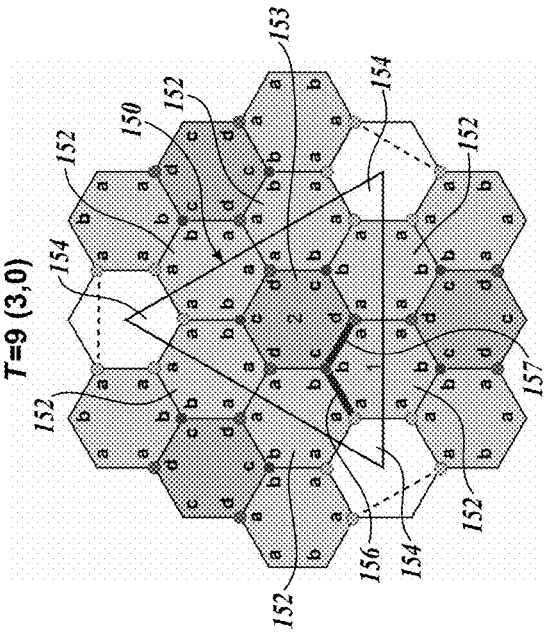
FIG. 3A illustrates a T=4 (2,0) Goldberg triangle, showing angle labels (a and b), and having only one type of DAD edge, one of which is shown in bold.
Figure 3B:
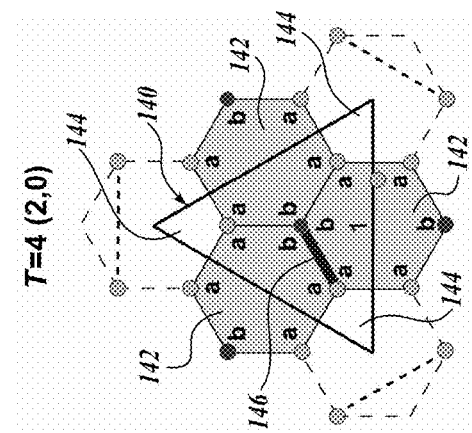
FIG. 3B illustrates a T=9(3,0) Goldberg triangle, showing angle labels (a, b, c, and d), and having three types of DAD edges, wherein one of each type of DAD edge is shown in bold.

Similarly, in FIG. 3B a T=9 (3,0) Goldberg triangle 150 involves six symmetry-equivalent peripheral 6gons 152, one interior 6gon 153, and end portions 154, with angles "a", "b", "c", and "d" as indicated. Therefore, the T=9 (3,0) Goldberg triangle 150 has two 6gon types 152 and 153, and two types of DAD edges 156, 157.

Figure 3C:
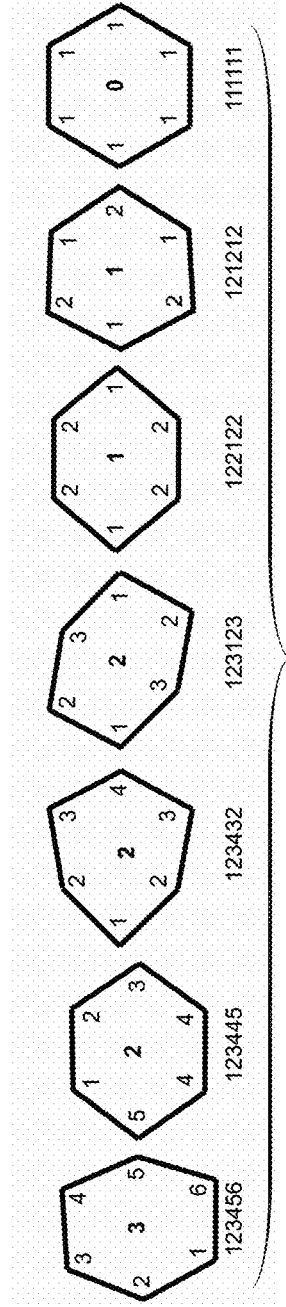
FIG. 3C illustrates the seven different types of planar equilateral 6gons, with angle labels showing the different patterns of internal angles, and the corresponding number of independent variables noted in the center of each 6gon.

Planar equilateral 6gons can appear with seven different patterns of internal angles, which are illustrated with labels in FIG. 3C. For example, the type with six different internal angles 123456 has three independent variables, as marked in the center of that 6gon. Conversely, in a regular 6gon the angles are all 120°, and so there is no independent variable.

Based on the taxonomy of planar equilateral 6gons and symmetry, we label the internal angles in the 6gons of Goldberg triangles. For each group of Goldberg triangles (h,0, h=k, and h≠k), the number of unique internal angles increases with T.

A more detailed discussion of the different patterns of internal angles is provided in the priority U.S. Provisional Patent Application No. 61/861,960, which is incorporated by reference above.

IV. Numbers of Variables and Equations

The number of independent variables in a planar equilateral n-gon with all different internal angles is n−3, thus 3 independent variables are required for a 6gon with the 123456 pattern (FIG. 3C). However, a planar equilateral n-gon constrained by symmetry has fewer independent variables. For example, the six other types of 6gon in FIG. 3C have from 0 to 2 independent variables, as marked in the center of each 6gon.

For each Goldberg triangle, we identify each 6gon's type and corresponding number of independent variables. For the equilateral cages we examined, the total number of independent variables ranged from 1 (FIG. 3A) to 18. For each of the three groups of cages (achiral (h,0), (h=k), and chiral (h≠k)), as T increases, the number of independent variables increases.

By definition, any edge with a vertex type (e.g., 566, 666, etc.) on one end that is different from the vertex type at the edge's opposite end is a DAD edge. In FIGS. 3A and 3B one example of each different type of DAD edge in each Goldberg triangle is marked as a thick black edge (i.e., 146, 156, and 157). Each unique type of DAD edge provides its own "zero-DAD" equation, corresponding to Eq. 3. Conversely, in general an edge with the same vertex types at its two ends is not a DAD edge. However, two exceptions arise only in chiral h≠k cages. These exceptions are due to different arrangements of the same three internal angles at their ends.

As shown above, a cage will have all planar faces only if all of the DADs in the cage are zero. Therefore, for a given cage, we compare the number of different types of DAD edges—hence the number of zero-DAD equations—with the number of independent variables. To our astonishment, for all of the cages we studied, even for chiral cages, the number of different DAD equations and the number of independent variables are equal. We take this to be the general rule. Therefore, for each equilateral cage, there may exist a unique "polyhedral solution," i.e., a set of internal angles that brings all of the DADs to zero, and therefore makes all of the faces planar and all of the vertices convex.

V. Solving the Systems of Equations for T=4

The Goldberg triangle for T=4, (see FIG. 3A) has one independent variable, internal angle a or b (since if you know one, you can calculate the other), and one type of DAD edge 146. We first consider the icosahedral cage. To compute the dihedral angle at the 5gon end of the DAD edge 146, we take advantage of the labeling of angles in FIG. 3A: Using Eq. 2 we set $\alpha=108°$ and $\beta=\gamma=(360-b)/2$. Then, to compute the dihedral angle at the 6gon end, in Eq. 2 we replace $\alpha$, $\beta$, $\gamma$ and $\gamma$ by internal angle b. Then, we solve the zero-DAD Eq. 3 analytically, yielding $b=2\times\arccos\lfloor\sqrt{1/(3-2\times\cos(108°))}\rfloor$ or 116.565°. Therefore a=(720−2×b)/4=121.717°. The 6gons in this new icosahedral Goldberg polyhedron are planar, as confirmed by internal angles that sum to 720°.

Angle deficit is the difference between the sum of internal angles at a flat vertex (360°) and the sum at a vertex with curvature. In the icosahedral T=3 polyhedron (the truncated icosahedron), the 12 pentagons are responsible for all of the 720° of angle deficit required by Descartes' Rule, and each of the sixty 566 (108°, 120°, 120°) vertices around the pentagons has 12° of angle deficit. By contrast, in the new icosahedral T=4 Goldberg polyhedron, the 720° of the angle deficit are distributed among all vertices, 8.565° for each of the sixty 566-vertices (108°, 121.717°, 121.717°), and 10.305° for each of the twenty 666 vertices (116.565°, 116.565°, 116.565°).

The octahedral and tetrahedral polyhedral solutions for T=4 may be computed as above, except that the internal angles in the corner faces ($\alpha$ in Eq. 2) are respectively 90° and 60° instead of 108°. For the octahedral T=4 polyhedron, $b=2\times\arccos(\sqrt{1/3})$ or 109.471°, so a=125.264°. For the tetrahedral T=4 polyhedron, $b=2\times\arccos(\sqrt{1/2})$ or 90°, so a=135°.

Thus, for T=4, for each of these three types of polyhedral symmetry, there is one Goldberg polyhedron.

VI. Mathematically Solving the Systems of Equations for T>4 for Icosahedral Polyhedra For T>4, we solve each system of n simultaneous zero-DAD equations with n variables for cages with T=7, 9, 12, and 16, and n from 2 to 4.

For example, the T=9 cage has two zero-DAD equations and two variables. Given perimeter angle a we may obtain b (i.e., b=360°−2a). Given spoke-end angle c, we may obtain d (i.e., d=240°−c). We thus choose angles a and c as the two independent variables. The two zero-DAD equations are both in the form of Eq. 3: DAD#1 is for the spoke edge from the corner 556 vertex (108°-a-a) to the 666 vertex (c-b-b), and DAD#2 is for the "post-spoke" edge from one 666 vertex (b-c-b) to another 666 vertex (a-a-d).

Figure 4A:
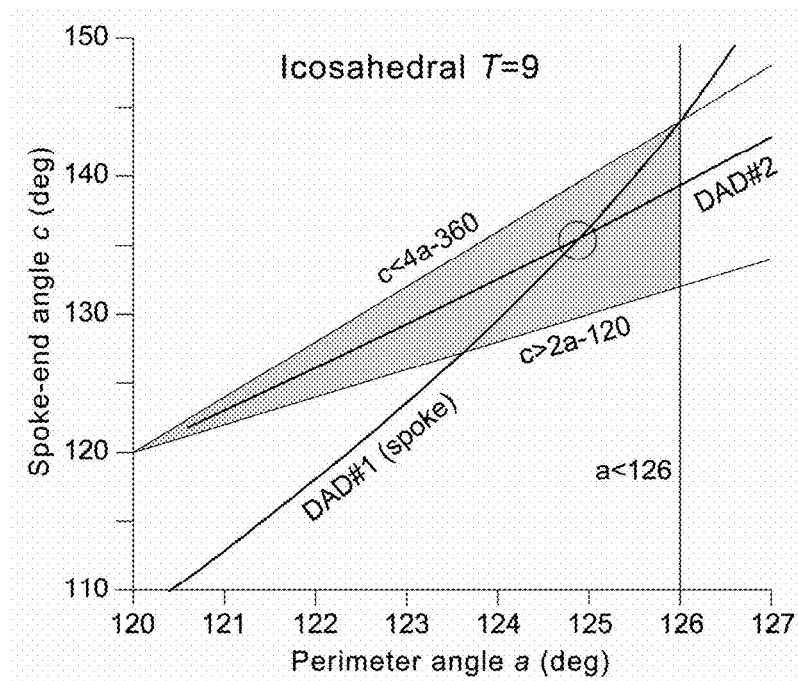
FIG. 4A shows polyhedral solutions for the icosahedral Goldberg polyhedron with T=9, wherein the circled intersection of the DAD#1 curve and the DAD#2 curve gives perimeter angle a and spoke-end angle b.

The loci of solutions for each zero-DAD equation is a curve in the a-c plane, shown in FIG. 4A. The DAD#1 curve is calculated analytically and the DAD#2 curve is calculated numerically, as discussed in more detail in Provisional Patent Application No. 61/861,960 incorporated by reference above. The two curves intersect at the circled point in FIG. 4A. The internal angles a, b, c, and d must also satisfy three inequalities, that the sums of the internal angles must be <360° for each of the three vertex types ((108°-a-a), (c-b-b), and (a-a-d)). These inequalities become bounding inequalities (a<126°, c>2a-120°, and c<4a-360°) in the graph in FIG. 4A, restricting (a, c) values for physically realizable, convex polyhedra to the shaded interior of the triangular region.

Figure 4B:
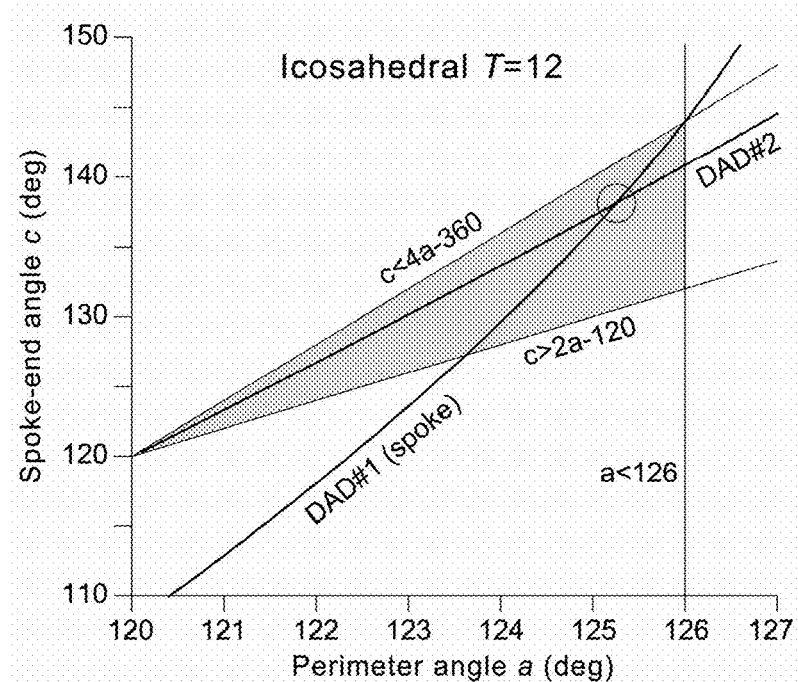
FIG. 4B shows polyhedral solutions for the icosahedral Goldberg polyhedron with T=12, wherein the circled intersection of the DAD#1 curve and the DAD#2 curve gives perimeter angle a and spoke-end angle b.

For T=12, and all achiral icosahedral cages for T>4, the spoke edge (from the 108°-a-a vertex to the c-b-b vertex) and the labeling of 6gon #1 are the same as for T=9, so the DAD#1 curves in FIG. 4A and FIG. 4B are the same. Also, for all of achiral icosahedral polyhedra, the same bounding inequalities apply (a<126°, c>2a-120°, and c<4a -360°), giving the same shaded triangle. However, for T=12, the zero-DAD equation for DAD#2 and its corresponding curve, obtained numerically, are different from those for T=9, producing a different polyhedral solution in FIG. 4B.

For chiral icosahedral cages (e.g., with T=7), we reduce by one the number of both independent variables and DAD equations, 3 for T=7, by setting equal all of the internal angles around the perimeter of the corner faces (5gons), that is, by setting b=a. It follows that for chiral cages, the curve for the spoke DAD originating in the corner vertex—now 108°-a-a instead of 108°-a-b—is also given analytically. With two variables and two equations, we use numerical methods to obtain mathematically the icosahedral polyhedral solution for T=7.

VII. Solving the Systems of Equations for Icosahedral Polyhedra with Chemistry Software It will be appreciated by persons of skill in the art that alternatively the structure of the new Goldberg polyhedra disclosed herein may be conveniently calculated using a molecular modeling and computational chemistry application, such as the Spartan™ software available from Wavefunction, Inc, a California corporation having an address in Irvine, Calif. Given equal numbers of equations and variables, the polyhedral solution should be unique for each Goldberg triangle. Therefore, chemistry software that enforces planarity, as well as equilaterality, should give the same angles as the mathematical solutions above. Indeed, for all of the polyhedra for which we obtained solutions mathematically, that is, for T=4, 7, 9, 12, and 16, the internal angles agree. The chemistry software calculates a polyhedral solution slightly differently than the numerical solution described above. In particular the chemistry software finds angles within the hexagonal and pentagonal rings that reduce the dihedral angles discrepancy to zero throughout the cage.

Having confirmed the mathematical solutions and the accuracy of the solutions computed by chemistry software, we use the chemistry software to produce the icosahedral polyhedra for achiral cages with T≤49 and chiral cages with T≤37. To validate these unique solutions for these larger cages, we confirm for each that all DADs are zero, that the interior angles in 6gons sum to 720°, that the internal angles at vertices sum to less than 360°, that polyhedral symmetry still applies, and that the cage is convex. Because of the possibility of "twist," a DAD of zero about an edge by itself does not guarantee planarity of the two faces flanking that edge. However, our mathematical solutions incorporate a sum of 720° for each 6gon, which enforces planarity. Twist is thus precluded. Even for a cage as complex as T=37, with 6 types of 6gons, 36 internal angles, 18 independent variables, and 18 zero-DAD equations, this method works well.

Surprisingly, the icosahedral Goldberg polyhedra, as defined herein, are nearly spherical.

The new class of equilateral convex polyhedra with polyhedral symmetry consists of a single tetrahedral polyhedron for T=4, a single octahedral polyhedron for T=4, and a countable infinity (38) of icosahedra for T≥4, one for each pair (h,k) of positive integers. Why has it taken ~400 years since Kepler discovered his two rhombic polyhedra to discover these Goldberg polyhedra? There are a number of reasons.

(1) Goldberg's method for creating cages with polyhedral symmetry (11) was not invented until the 20$^{th}$ century.

(2) DAD had to be invented as a measure of nonplanarity.

(3) It was necessary to recognize the possibility that the nonplanar 6gons of a Goldberg cage might be made planar by bringing all of its DADs to zero.

(4) We do not believe there was reason to think it was possible to do so until we learned how to count zero-DAD equations and independent variables and found equal numbers of each.

(5) For the Goldberg polyhedra with T=4, each with just n=1 zero-DAD equation and one variable, an analytic solution could be obtained with pencil and paper. For somewhat larger T, we could obtain numerical solutions from a spreadsheet. However, even this method fails for n>4 variables and simultaneous transcendental equations.

(6) Fortunately, an alternative approach based on molecular mechanics can provide equilateral polyhedral solutions for large T with large n.

The reasoning developed here, specifically counting equations and variables to determine if an equilateral polyhedral solution is possible and the techniques, particularly the use of chemistry software as a geometry engine, can be applied to other types of cage. In this way, it should be possible to obtain additional new classes of highly symmetric convex polyhedra. These polyhedra could be useful in applications requiring rigid structures that approximate spheres.

Figure 5:
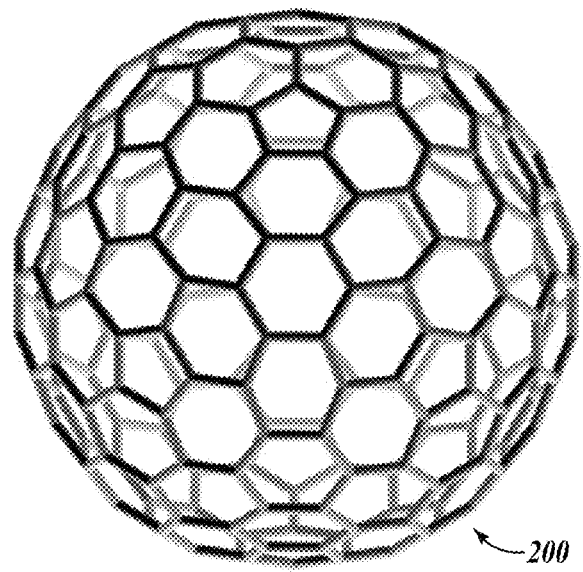
FIG. 5 is an exemplary convex equilateral polyhedral cage in accordance with the present invention.

An exemplary Goldberg polyhedral equilateral framework 200 in accordance with the present invention is shown in FIG. 5, for T=12 and (h,k)=(2,2). Adopting nomenclature from U.S. Pat. No. 2,682,235 to Richard Buckminster Fuller, which is hereby incorporated by reference in its entirety, a framework is defined to be "the frame of a structure for enclosing space, [the framework] may be skeletal, as when made of interconnected struts; or continuous as when made of interlocking or interconnected sheets or plates."

The framework 200 comprises a plurality of interconnected struts that are assembled to define a plurality of hexagonal planar (open) faces and a plurality of pentagonal planar (open) faces. Moreover, the interconnected struts of the framework 200 are equal in length. If the planar faces of the framework 200 are provided with planar panels, the assembly would define a nearly spherical polyhedron or a portion of such a polyhedron.

A "nearly spherical polyhedron" is herein expressly defined to mean a polyhedron for which there exists a center point in space wherein the longest distance from the center point to any vertex of the polyhedron is within ten percent of the shortest distance from the center point to the any other vertex of the polyhedron.

A "nearly spherical dome" is herein expressly defined to mean a dome for which there exists a center point in space wherein the longest distance from the center point to any point on the dome is within ten percent of the shortest distance from the center point to any point on the dome.

A "nearly spherical polyhedral cage" is expressly defined to mean a polyhedral cage for which there exists a center point in space wherein the longest distance from the center point to either end of any struts of the polyhedral cage is within ten percent of the shortest distance from the center point to either end of any other strut of the polyhedral cage.

The framework 200 may comprise only a portion of the nearly spherical polyhedron, for example, only the upper half, to define a substantially spherical dome or strut framework. If the framework 200 comprises a plurality of struts, preferably the struts are interchangeable. Interchangeability of the struts provides many manufacturing and assembly advantages, including lower inventory requirements, lower manufacturing costs, and simplified assembly. Such construction is particularly amenable to automated construction. For example, an automated system would not need to supply and distinguish between a plurality of struts. It is believed that the polyhedral convex framework 200 will also exhibit structural advantages, as an attractive alternative to other geodesic dome constructions, for example, those relying on a plurality of segmented great circle strut designs.

Figure 6:
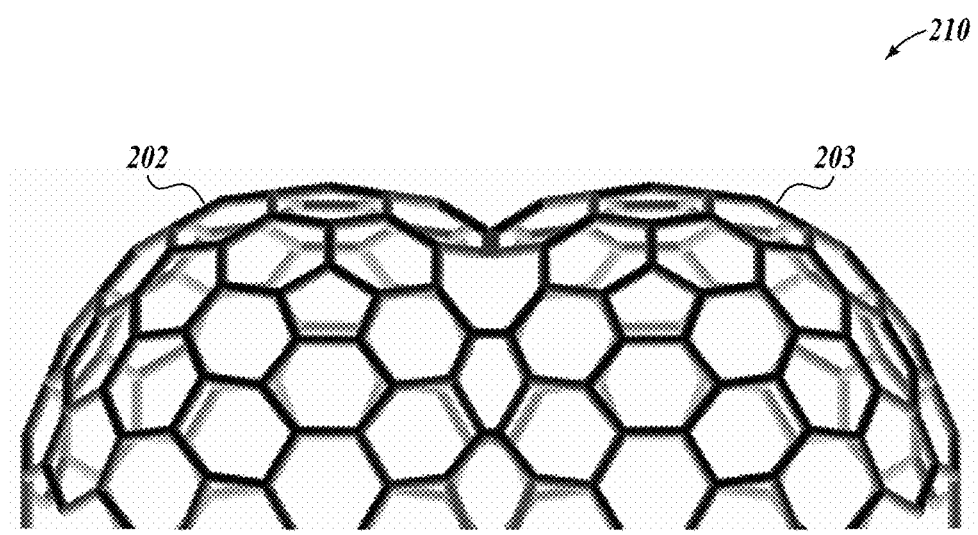
FIG. 6 is an exemplary cage in accordance with the present invention, formed by combining or joining two convex equilateral cages.

It is also contemplated that a plurality of partial cages or frameworks in accordance with the present invention may be joined with struts that may be equal in length to the struts defining the partial frameworks. For example, a substantially spherical segment comprising a portion of the framework 200 may be combined with a second segment to form a multi-dome equilateral structure. FIG. 6 illustrates an exemplary framework 210 formed by combining or joining two polyhedral framework portions 202, 203. The framework portions 202, 203 may be joined, for example, with joining struts that are preferably, but not necessarily, interchangeable with the equilateral struts that form the other struts of the framework 210. Other constructions will be readily apparent to persons of ordinary skill in the art.

The framework may alternatively comprise a plurality of flat structural, hexagonal and pentagonal, equilateral plates, wherein at least some of the hexagonal plates are not equiangular.

VIII. Cages Related to Uniform Tilings

Broadly, cages are composed of vertices and edges. The kinds of patterns used henceforth to generate new cages and polyhedra are tilings, which are also composed of vertices and edges. We are particularly interested in uniform tilings, such as those shown in FIGS. 7A-9C, where "uniform" means that each tiling has just one type of vertex. Three of the 11 uniform tilings are Platonic tilings, which have just one type of face. These are also known as "regular" tilings. For example, a uniform hexagonal tiling has 6.6.6 vertices, i.e., trivalent vertices each surrounded by three 6gons. For a Platonic 6.6.6 tiling 300 (FIG. 7A), axes of 6-fold rotational symmetry run through the centers of hexagonal faces (or tiles). For the Platonic 4.4.4.4 tiling 310 (FIG. 7B), axes of 4-fold rotational symmetry run through the centers of square faces.

Figure 8A:
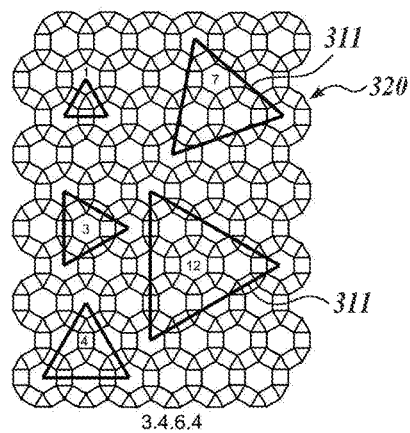
Figure 8B:
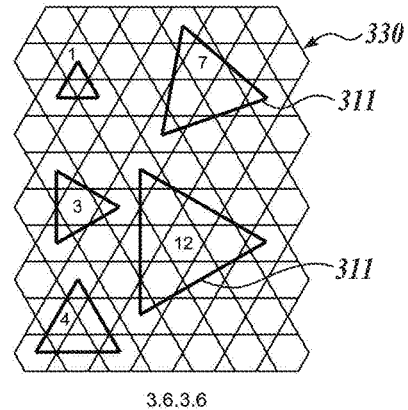
Figure 8C:
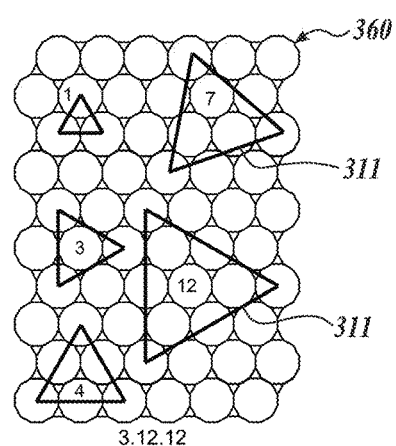
Figure 8D:
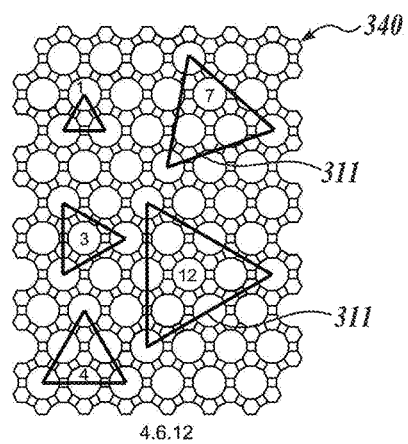
Figure 8E:
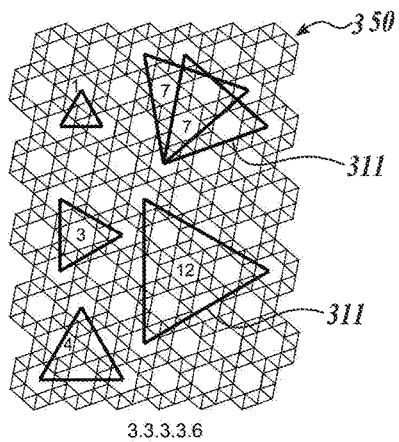

Eight of the 11 uniform tilings are Archimedean tilings, which have more than one type of face. These are also known as "semi-regular" tilings. Five of the Archimedean tilings are shown in FIGS. 8A-8E, which show the 3.4.6.4 tiling 310 (FIG. 8A), the 3.6.3.6 tiling 330 (FIG. 8B), the 3.12.12 tiling 360 (FIG. 8C), the 4.6.12 tiling 340 (FIG. 8D), and the 3.3.3.3.6 tiling 350 (FIG. 8E). These tilings all have faces with 6fold axes through their centers, so they may also be called 6ffold-Rrchimedean tilings.

Figure 9A:
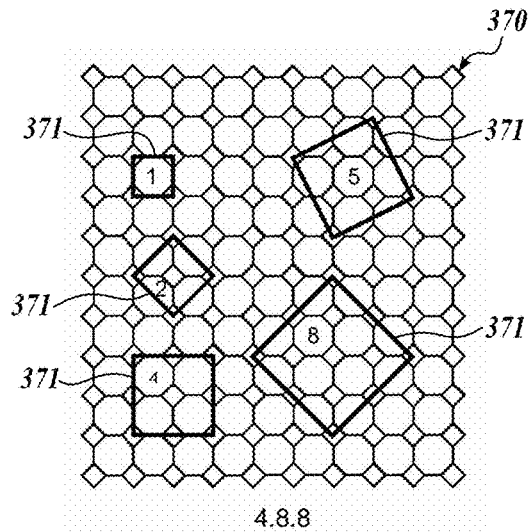
Figure 9B:
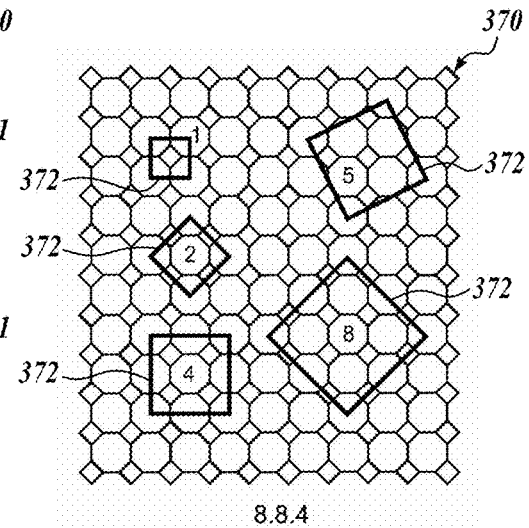
Figure 9C:
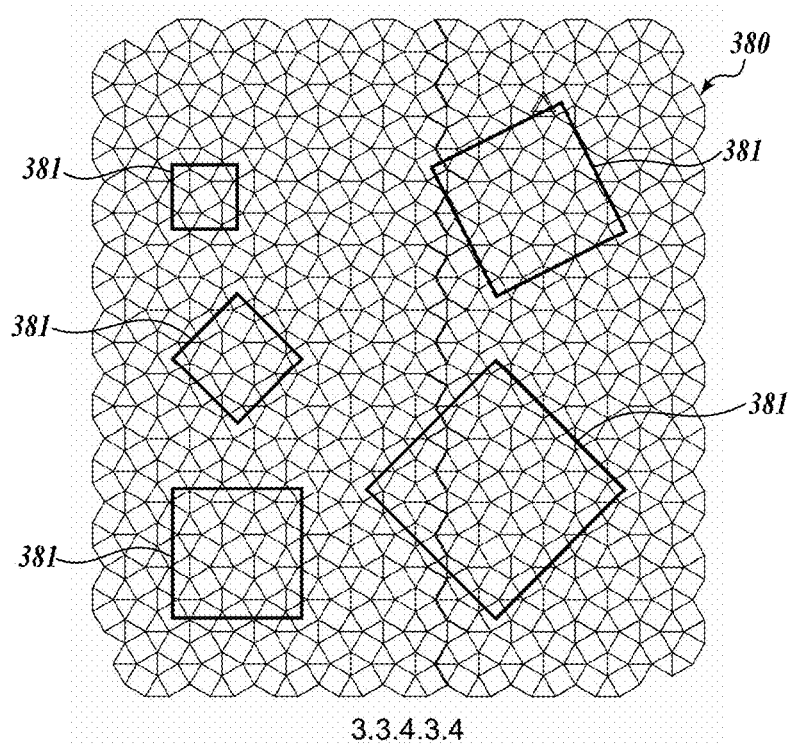
Figure 10A:
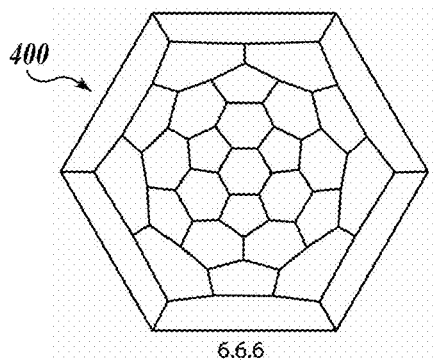
Figure 10B:
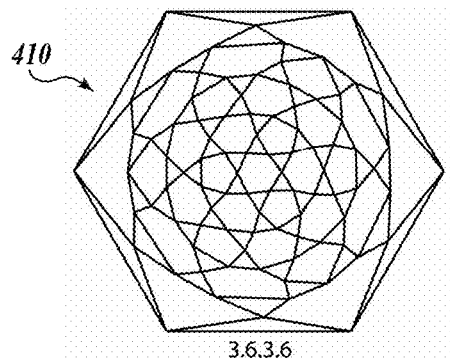
Figure 10C:
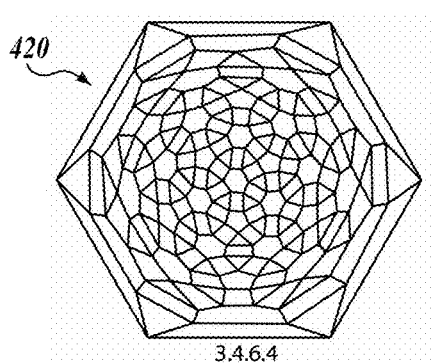
Figure 10D:
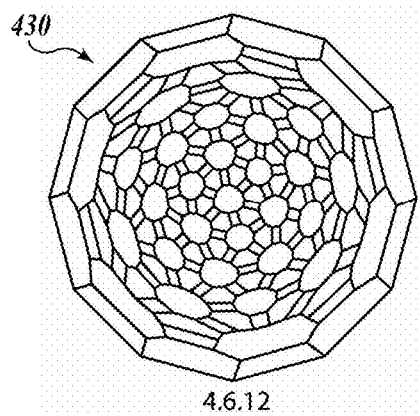
Figure 10E:
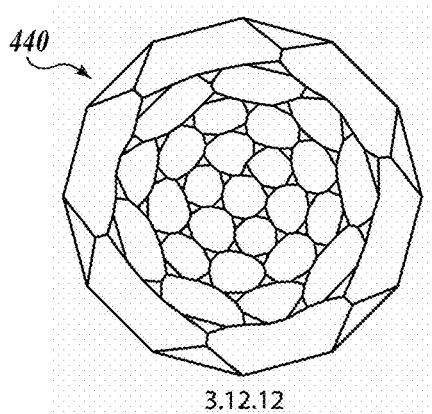
Figure 10F:
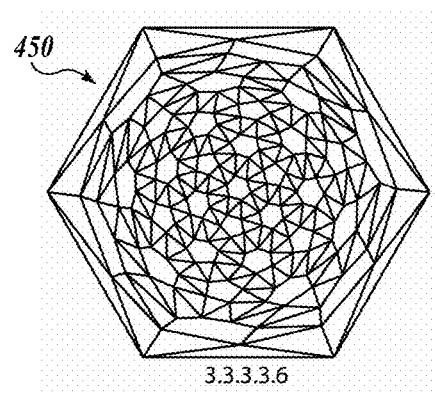
Figure 10G:
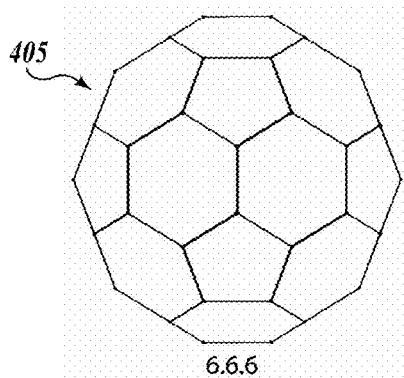
Figure 10H:
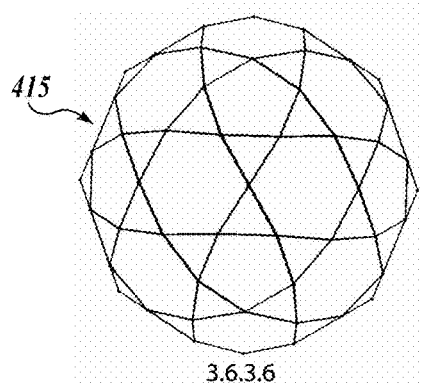
Figure 10I:
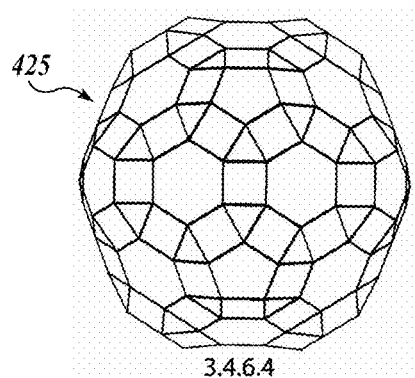
Figure 10J:
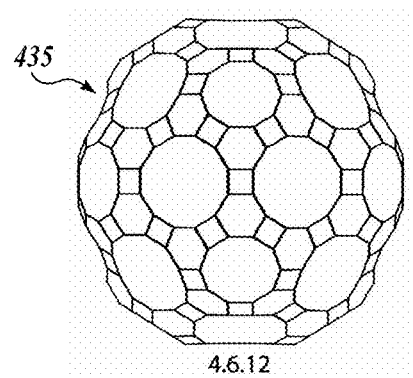
Figure 10K:
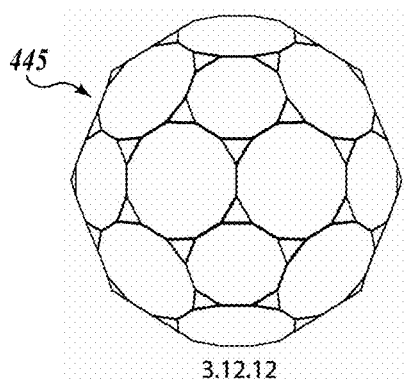
Figure 10L:
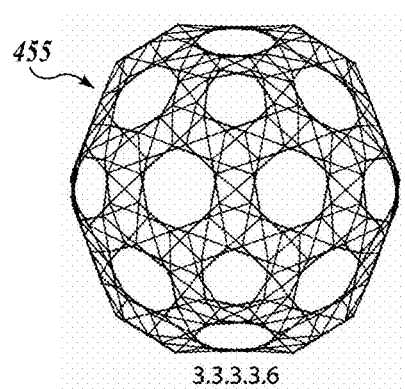

Two of the Archimedean tilings are shown in FIGS. 9A-9C, which show the 4.8.8 tiling 370 (FIGS. 9A and 9B) and the 3.3.4.3.4 tiling 380 (FIG. 9C). These tilings have faces with 4fold axes through their centers, so they may also be called the 4fold-Archimedean tilings.

IX. New 6Fold- and 4Fold-Goldberg Cages and Convex Polyhedra with Polyhedral Symmetry A. Placing Uniform Tilings on Platonic Polyhedra following the 6Fold-Goldberg Construction.

Figure 7A:
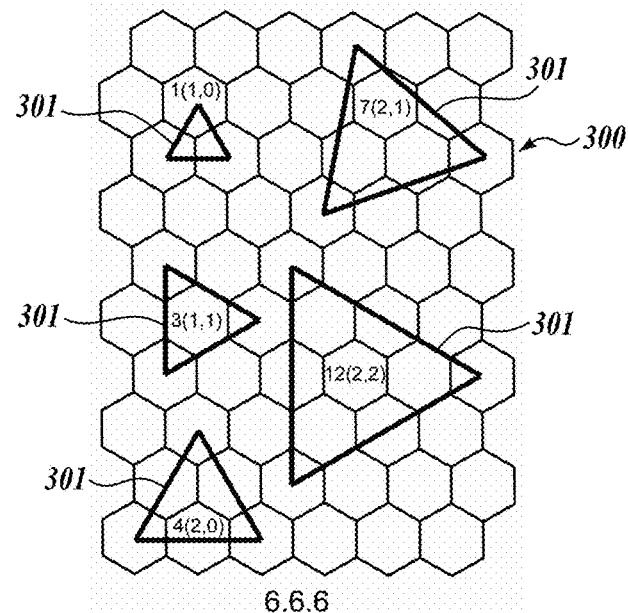

As described in detail in detail above, the 6fold Goldberg construction begins by placing a large equilateral Triangle 301 over a 6.6.6 tiling 300 with the corners of the Triangle 301 at the (6fold) centers of hexagons (FIG. 7A). As noted above, herein the word "Triangle" with an upper case T indicates a large Triangular patch 301, not a triangular face. Each Goldberg Triangle 301 is drawn according to two indices h and k. The number of vertices (T) in each Triangle 301 is given by an equation, $T=h^2+hk+k^2$. Thus, a Triangle 301 with indices (h,k)=(2,2) would have a T number of 12, representing 12 vertices per Triangular patch 301. In FIG. 7A, exemplary Triangles 301 having sizes and orientations corresponding to T(h,k) of 1(1,0), 3(1,1), 4(2,0), 7(2,1), and 12(2,2) are shown.

Figure 1A:
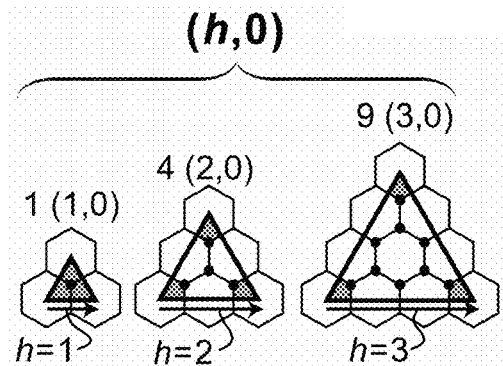
Figure 1B:
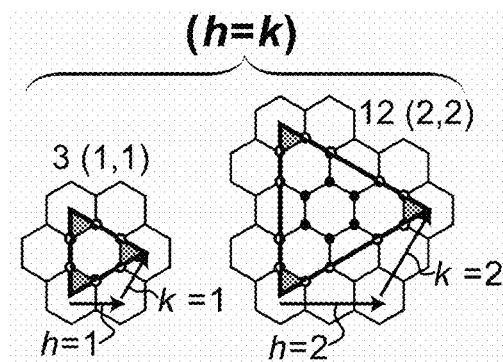
Figure 1C:
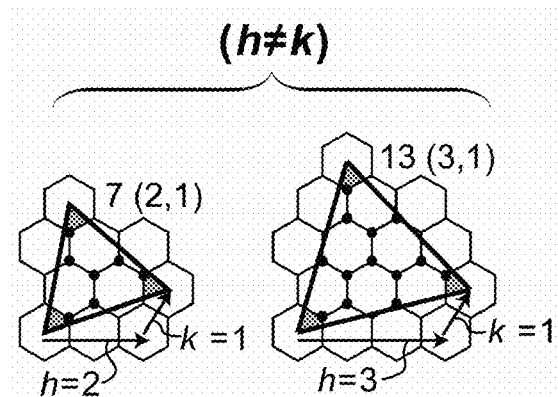
Figure 1E:
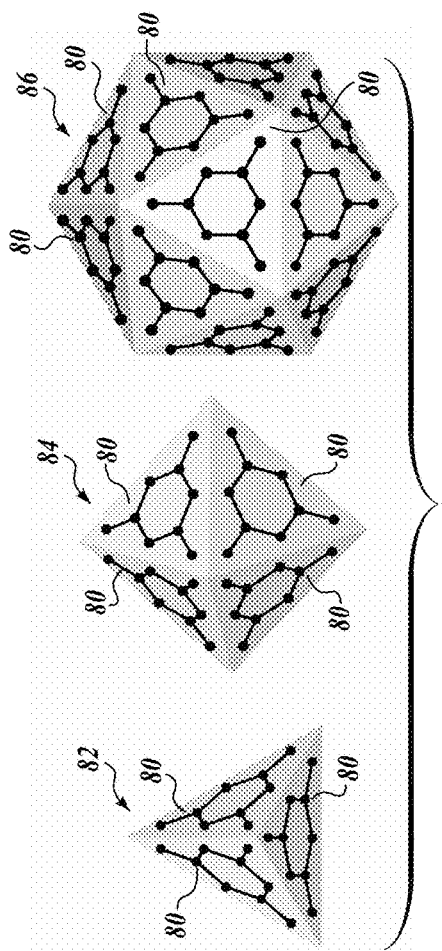
FIG. 1E illustrates the Goldberg triangle from FIG. 1D applied to the triangular faces of a tetrahedron, an octahedron, and an icosahedron.
Figure 1F:
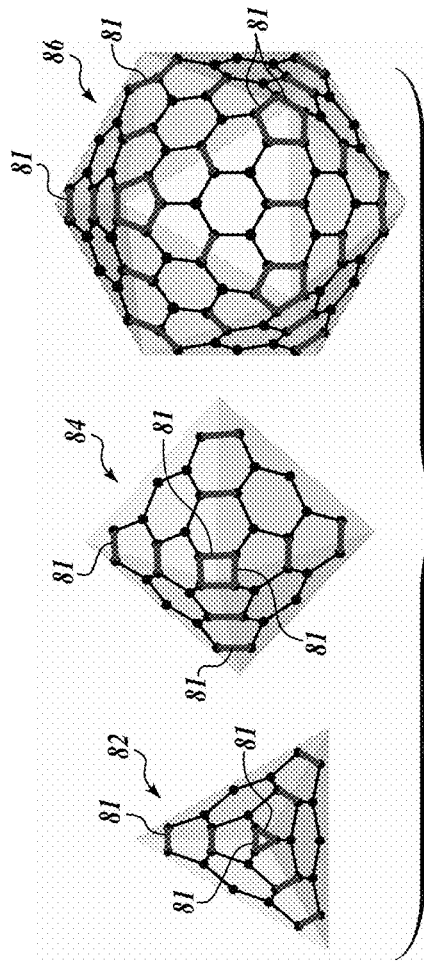
FIG. 1F illustrates a final step in constructing a Goldberg cage comprising the addition of connecting edges across boundaries of the faces of the polyhedron shown in FIG. 1E to form a cage.
Figure 1D:
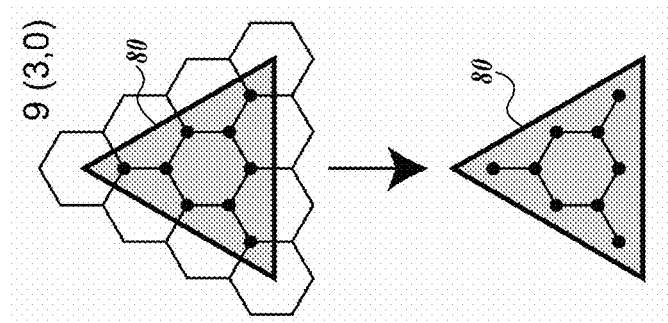
FIG. 1D illustrates an exemplary Goldberg triangle equilateral patch.

The Triangular patch 301 (that includes hexagons and parts of hexagons) is then used to decorate each of the 20 triangular facets of an icosahedron, the 8 triangular faces of an octahedron, or the 4 triangular faces of a tetrahedron (see FIG. 1E). This operation produces icosahedral Goldberg cages with 20 T vertices, octahedral cages with 8 T vertices or tetrahedral cages with 4 T vertices. We note that the icosahedral Goldberg cages are members of the very large class of fullerene cages, all with 5gonal faces, 6gonal faces and 3valent vertices, representing 28 distinct point-group symmetries.

The smallest member in each achiral (h,0) group of Goldberg Triangles is (h,k)=(1,0) (FIG. 7A). Using the (1,0) Triangular patch on the icosahedron, the octahedron and the tetrahedron produces three of the Platonic polyhedra: the dodecahedron, the cube, and the tetrahedron, respectively. Successive members of the (h,0) group are (2,0); (3,0); (4,0), etc.

The smallest member of the achiral h=k group is (1,1), which has T=3. Placement of this Triangular patch onto the icosahedron, the octahedron and the tetrahedron, produces three of the Archimedean polyhedra: the truncated icosahedron, the truncated octahedron and the truncated tetrahedron, respectively. Successive members of the h=k group are (2,2); (3,3); (4,4), etc.

The first member of the chiral h≠k (group is (2,1). Successive members include (3,1); (4,1); (5,1) . . . ; (3,2); (4,2); (5,2) . . . ; (4,3); (5,3); (6,3) . . . , etc.

From the "Goldberg-6.6.6 cages" so produced, a method is described above for producing convex equilateral icosahedral, octahedral, and tetrahedral "Goldberg-6.6.6 polyhedra," which by the definition of a "polyhedron" must have planar faces. (Previously, we have used the terms "Goldberg cages" and "Goldberg polyhedra" without specifying the 6.6.6 tiling from which it was derived. Our reason for adding the tiling specification (6.6.6) will become clear shortly.)

In an extension of this method for constructing cages, rather than using the 6.6.6 tiling described in the 6fold-Goldberg construction, we use any of the five Archimedean tilings that also have 6fold faces (FIGS. 8A-8E). Corresponding triangular patches 311 are shown, which patches may be used as described above to decorate the faces of Platonic polyhedra and provided with connecting edges across faces to generate cages, some of which may then be transformed to produce equilateral cages (or used to produce polyhedra).

Each of these 6fold-Archimedean tilings 320, 330, 340, 350, 360 is designated by its vertex type, i.e., 3.4.6.4, 3.6.3.6, 4.6.12, 3.3.3.3.6, and 3.12.12, respectively. By this new 6fold-Goldberg method, we produce five new classes of icosahedral cage, five new classes of octahedral cage and five new classes of tetrahedral cage. We therefore identify these cages by their vertex type, i.e., as icosahedral, octahedral and tetrahedral Goldberg-3.4.6.4 cages, Goldberg-3.6.3.6 cages, Goldberg-3.12.12, Goldberg-4.6.12, and Goldberg 3.3.3.3.6 cages, respectively.

FIGS. 10A-10F are well-known 2-dimensional graphs called Schlegel diagrams, showing the connectivity of vertices and the edges of the icosahedral 6.6.6 cage 400 and five Archimedean cages 410, 420, 430, 440, 450 for one set of T-number (3) and (h,k) indices (1,1). The 6fold-Archimedean Goldberg cages can be transformed into convex equilateral polyhedra with polyhedral symmetry (icosahedral, octahedral and tetrahedral) by the same methods described above to planarize Goldberg-6.6.6 cages 400 described above, thus producing five new classes of convex equilateral polyhedron, five with icosahedral symmetry, five with octahedral symmetry, and five with tetrahedral symmetry. FIGS. 10G-10L show the icosahedral convex equilateral polyhedra 405, 415, 425, 435, 445, 455 corresponding to the cages diagrammed in FIGS. 10A-10F.

In particular we count the numbers of equations that null the dihedral angle discrepancy ("DAD"), and we count the number of variables to see if they are equal. If they are equal, a unique solution may exist that produces planar faces to transform an equilateral cage into an equilateral polyhedron. Alternatively, the equations may be those that null dihedral angles within faces and set edge lengths to identical values. By "variables," we mean the subset of internal angles in the faces of the cage that (a) maintain the symmetry of the cage and that (b) determine all of the other internal angles in faces. Or, the variables may be the three (x, y and z) coordinates of the vertices.

Although in the analysis above we focused on null-DAD equations, we can instead focus on the dihedral angles within faces. In that case, we planarize each 4gonal face by setting at least one dihedral angle within the face to zero, each 5gonal face by setting at least two dihedral angles to zero, and each 6gonal face by setting at least three dihedral angles to zero. Correspondingly, the internal angles of each 4gon, 5gon, and 6gon are fully determined by setting one, two, or three internal angles. Therefore, for each polyhedron, with equal numbers of equations and variables, there may be solutions—with internal angles in faces that planarize each face—that transform the equilateral cage into an equilateral polyhedron with planar faces, which may or may not be convex.

We therefore outline herein several methods that may be used to planarize Goldberg-6.6.6 cages. These include (a) analytically or (b) numerically solving a system of simultaneous DAD equations to produce zero DAD for each of the null-DAD equations, and (c) analytically, (d) numerically, or (e) with chemistry software nulling dihedral angles within each face of the cage.

Although we have focused on equilateral cages and polyhedra, our inventions cover both non-equilateral and equilateral cages and polyhedra.

The same (h,k) indexing system applies to the new 6fold-Archimedean Goldberg cages—the five new icosahedral, the five new octahedral, and the five new tetrahedral classes produced by the 6fold-Goldberg construction from each of the five 6fold Archimedean tilings. However, the number of vertices per Triangular patch is different by a factor. For example, the T number for the 3.6.3.6 tiling is $3/2*(h^2+hk+k^2)$, thus a factor of 3/2 as many as for the 6.6.6 tiling.

Nonetheless, we keep the T number (e.g., T=12 for h,k=2,2) for all of the 6fold tilings and simply apply the factor 3/2 to calculate number of vertices for Goldberg-3.6.3.6 Triangles and cages. (For example, the T=1 Goldberg-3.6.3.6 Triangle in FIG. 8B has 3 vertices shared two ways, thus 3/2 vertices instead of 1. And, the T=3 Goldberg-3.6.3.6 Triangle in FIG. 8B has 3 unshared vertices and 3 vertices shared two ways, thus 3+3/2=4.5 vertices instead of 3, greater by the same factor 3/2.) The factors for the Goldberg 3.4.6.4, 3.6.3.6, 3.12.12, 4.6.12, and 3.3.3.3.6 Triangles are 3, 1.5, 3, 6 and 3, respectively.

Figure 7B:
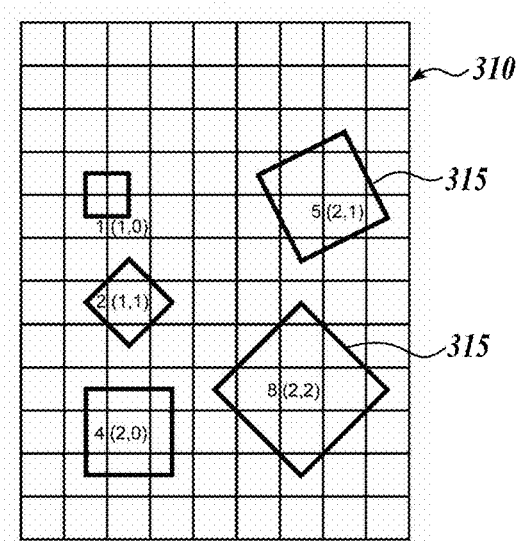

B. Placing Uniform Tilings on Platonic Polyhedra following a 4Fold-Goldberg Construction Similarly, we create a new "4fold-Goldberg construction" method by positioning the corners of a large Square patch 315 over the centers of faces in a 4.4.4.4-tiling 310 (FIG. 7B). Each of these Square patches has $S=h^2+k^2$ vertices. We then use the large Square patch 315 (composed of squares and parts of squares) to decorate each of the six square facets of a cube to produce yet another new class of cages, namely, octahedral "Goldberg-4.4.4.4 cages," each with v=6S 4valent vertices. "Fullerene" as used herein is defined to mean cages having a specified number (v) of 3valent vertices, twelve corner 5gons and v/2-10 6gons. We similarly define the word "squarene" to refer to 4.4.4.4 cages with v 4valent vertices, eight corner 3gons and v-6 4gons.

Then, by use of our planarization methods described above, we transform many of these octahedral Goldberg-4.4.4.4 (octahedral squarene) cages into yet another new class of octahedral polyhedron with planar faces and equal edges.

The two 4fold-Archimedean tilings 370, 380 with 4fold axes centered on faces, 4.8.8 and 3.3.4.3.4 (FIGS. 9A-9C) admit three such 4fold-Goldberg constructions. For example, In FIG. 9A several exemplary large Square patches 371 are shown with corners centered over square faces in the 4.8.8 tiling 370. Any selected one of the Square patches 371 may then be used to decorate the six facets of a cube to produce an octahedral "Goldberg-4.8.8 cage." In FIG. 9B several exemplary Square patches 372 are shown with corners centered over octagons in the same 4.8.8 tiling. Any selected one of these Square patches 372 may be used to decorate the six facets of a cube to produce an octahedral "Goldberg-8.8.4 cage"—which derives from the same 4.8.8 tiling 370 but generates a new type of cage with a new name. In the same way, we can produce "Goldberg-3.3.4.3.4" cages using a Square patch 381 with corners centered over the square faces of the 3.3.4.3.3 tiling 380. Thus, this new 4fold-Goldberg construction produces three novel classes of octahedral 4fold-Archimedean Goldberg cage which we identify as Goldberg-4.8.8 cages, Goldberg-8.8.4 cages and Goldberg-3.3.4.3.4 cages; from which we also generate many corresponding equilateral planarized polyhedra by using the same methods described above.

This same h,k indexing system also applies to the new class of octahedral squarenes produced by the 4fold-Goldberg construction method operating on the 4.4.4.4 tiling 310 (FIG. 7B). However, because $S=h^2+k^2$, and the cube has 6 square facets, the number of vertices in the cage is 6S. Moreover, this indexing system applies to the three new classes of octahedral cage produced by the Goldberg construction method operating on the two 4fold Archimedean tilings but with modification of S for Squares and 6S for cages by the factors 4 for the 4.8.8, 8.8.4 and 3.3.4.3.4 Square patches 371, 372, 381 respectively (FIGS. 9A-9C).

C. Decorating the Truncated Tetrahedron, an Archimedean Polyhedron, with Uniform Tilings Another extension of the method, referred to herein as the Schein-Gayed-Yeh (SGY) construction, is illustrated in FIGS. 11A-11E. The SGY construction uses a large composite patch 502 comprising four large Hexagonal patches 501 of the 6.6.6 tiling 300 and four adjacent large Triangular patches 503 (FIG. 11A), which are applied to the four regular hexagonal and four regular triangular facets of a truncated tetrahedron 510 (FIG. 11B), one of the Archimedean polyhedra. This is the first instance in which we decorate a polyhedron that is not a platonic solid. Several other exemplary patches 505, 506, 507, 508 are shown on the 6.6.6 tiling 300 in FIG. 11A (each showing a portion of the composite patch that includes one Hexagonal patch 501 and one Triangular patch 503).

The large regular Hexagonal patches 501 can be considered as containing a large equilateral triangular sub-patch and three isosceles triangular sub-patches.

From these large Hexagonal and Triangular patches 501, 503, we construct two separate series of fullerene cages, all with $T_d$ point group symmetry: one has an h=k large equilateral triangle (e.g., (1,1), (2,2), (3,3) in patches 506, 507, 508) within its large Hexagonal patch 501; the other has an h=3n, k=0 large equilateral triangle (e.g., (3,0), (6,0)) within its large Hexagonal patch 501.

Figure 11A:
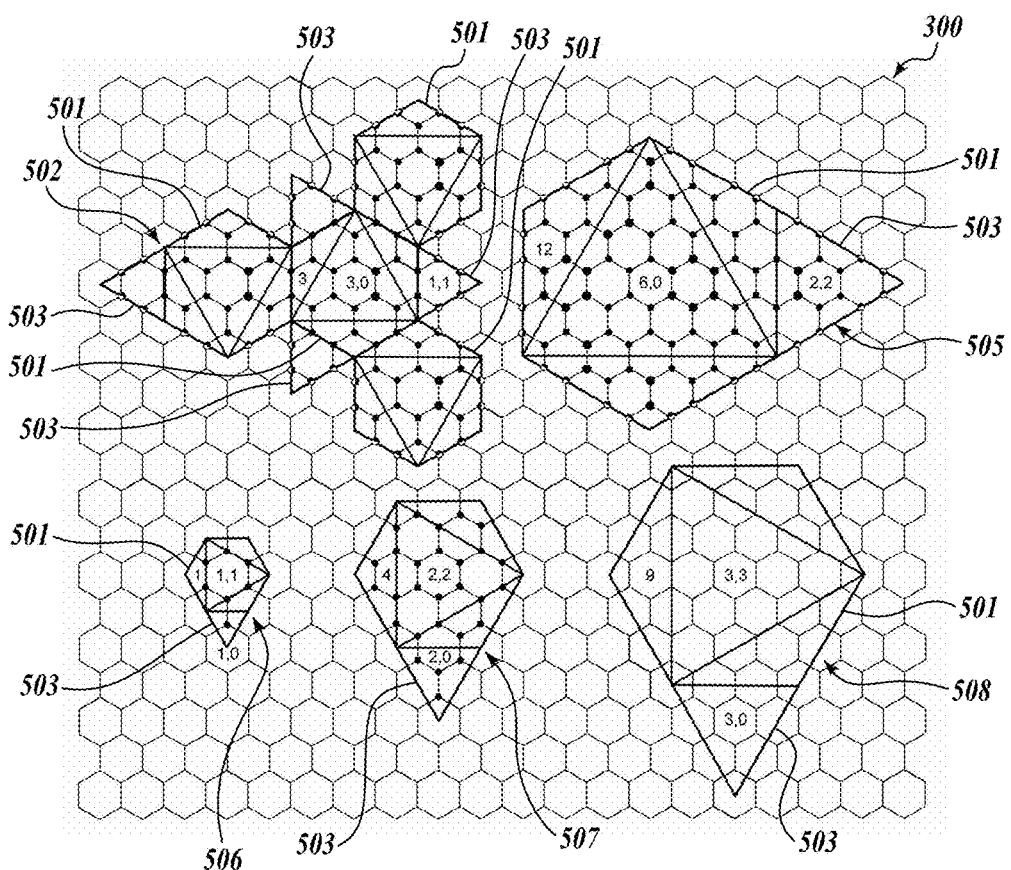
Figure 11B:
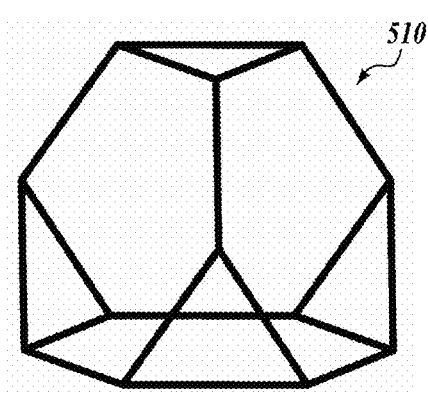
Figure 11C:
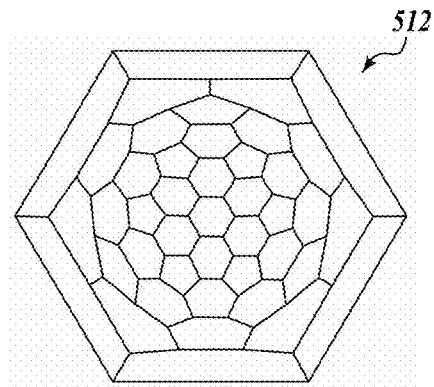

Two series of $T_d$ fullerene cages may be produced by the SGY construction (FIG. 3C), involving placement of contiguous Hexagonal and Triangular patches of a 6.6.6 tiling onto the four hexagonal and four triangular facets of a truncated tetrahedron. The table shows h,k indices of the large equilateral Triangular patch (e.g., 3,0) and the small equilateral Triangular patch (e.g., 1,1) along with the number of vertices in the scalene triangles (e.g. 3). The number of vertices in the scalene triangle—an isosceles triangle with internal angles 30°-120°-30°—is equal to the number of vertices in the small equilateral triangle (e.g., 3). The first three of each series are listed in Table 1. FIG. 11C shows the Schlegel diagram 512 for one such cage.

TABLE 1

SGY tetrahedral fullerenes

| Number of vertices v | Large equilateral Triangle T(h, k) | Scalene triangle number of vertices | Small equilateral triangle T(h, k) | Arrangement of pentagons |
|---|---|---|---|---|
| h = k series ||||| 
| 28 | 3(1, 1) | 1 | 1(1, 0) | one patch |
| 112 | 12(2, 2) | 4 | 4(2, 0) | isolated |
| 252 | 27(3, 3) | 9 | 9(3, 0) | isolated |
| h, 0 series ||||| 
| 84 | 9(3, 0) | 3 | 3(1, 1) | isolated |
| 336 | 36(6, 0) | 12 | 12(2, 2) | isolated |
| 756 | 81(9, 0) | 27 | 27(3, 3) | isolated |

Figure 11D:
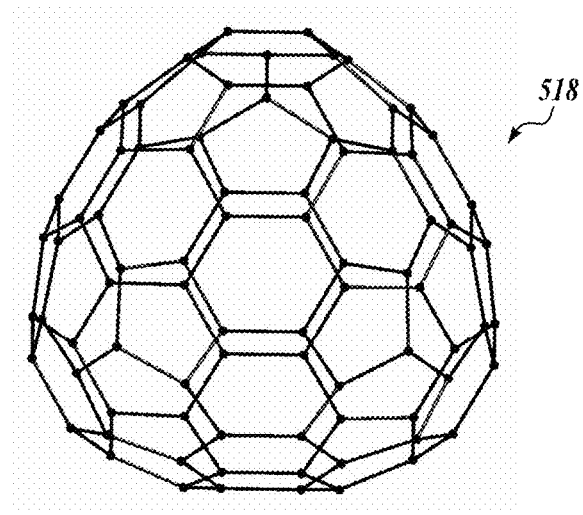

The same reasoning and methods that we used to planarize Goldberg cages described above, produces corresponding convex equilateral tetrahedral 6.6.6 (fullerene) polyhedra 518 (e.g., FIG. 11D).

We apply the SGY construction to the five 6fold Archimedean tilings (FIGS. 8A-8E) to produce five additional new classes of $T_d$ cage, corresponding one-for-one with the 6.6.6 cages described above. We call these new classes the "tetrahedral SGY-3.6.3.6" cages, the "tetrahedral SGY-3.4.6.4" cages, etc.

Some of these can also be transformed into convex equilateral polyhedra, which means that we also produce five new classes of convex equilateral tetrahedral ($T_d$) polyhedra as well as cages. For example, FIGS. 12A-12E show the equilateral 6.6.6 polyhedron with 112 vertices, as listed in Table 1, and four (i.e., 3.6.3.6; 3.4.6.4; 4.6.12; and 3.12.12) of the corresponding equilateral Archimedean $T_d$ polyhedra.

D. Decorating other Archimedean Polyhedra

Having now disclosed a method to cut out large Polygonal patches from a 6.6.6 tiling (FIG. 7A) that can fit onto the facets of an Archimedean polyhedron, the truncated tetrahedron, we ask if that method can be used with other Archimedean polyhedra. To understand what polygonal patches are needed, we note the vertex types in the 13 Archimedean polyhedra:

Icosahedral Archimedean polyhedra: 3.4.5.4; 3.5.3.5; 3.10.10; 4.6.10; 5.6.6; 3.3.3.3.5

Octahedral Archimedean polyhedra: 3.4.3.4; 3.4.4.4; 3.8.8; 4.6.6; 4.6.8; 3.3.3.3.4

Tetrahedral Archimedean polyhedra: 3.6.6

From a tiling with 6fold symmetry, like a 6.6.6 tiling, we cannot cut out large 4gonal, 5gonal or 10gonal patches, thus eliminating all of the icosahedral Archimedean polyhedra. From a tiling with 4-fold symmetry, like a 4.4.4.4 tiling, we cannot cut out large 3gonal or 6gonal patches, thus eliminating all of the octahedral Archimedean polyhedra. Therefore, the only admissible pairing of a uniform tiling and an Archimedean polyhedron is the previously described 6fold tiling and the truncated tetrahedron.

E. Construction of 6Fold Archimedean Structures from General Tetrahedral Fullerenes Fowler et al. (1988) "Systematics of bonding in non-icosahedral carbon clusters," (Theor Chem Acta 73:1-26), which is hereby incorporated by reference, describes construction of all tetrahedral 6.6.6 (fullerene) cages by a method that is related to but different from the Goldberg construction and different but related to the SGY construction.

Figure 11E:
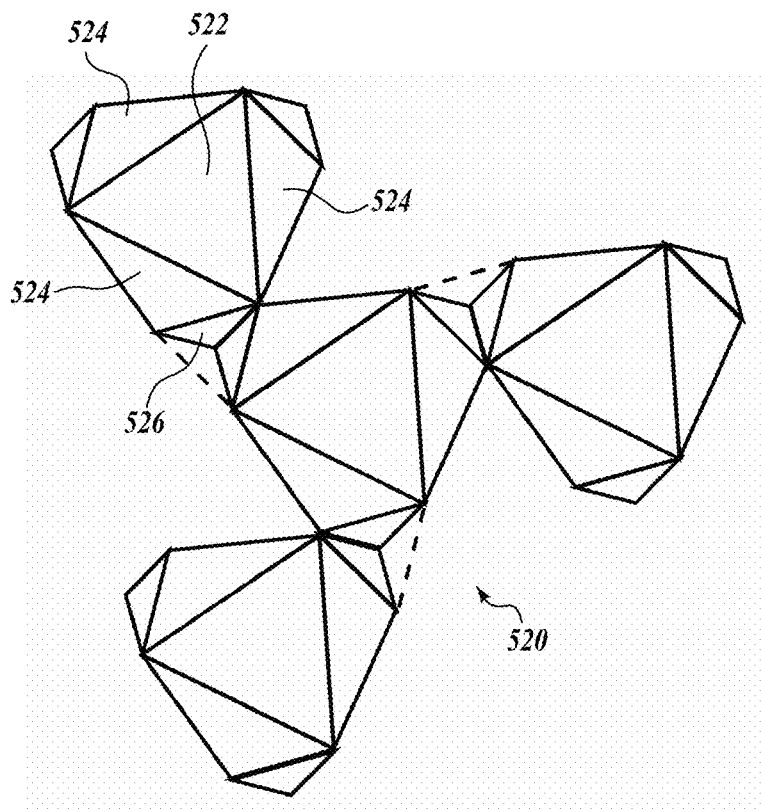
Figure 12A:
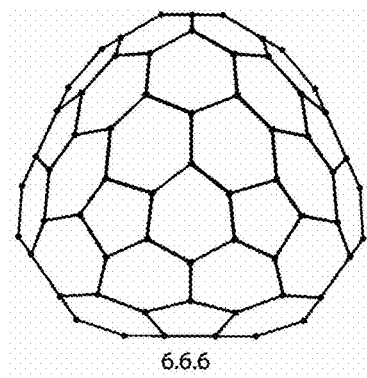
FIGS. 12A-12E illustrate the $T_d$ 6.6.6 polyhedron with 112 vertices and four of the five corresponding 6fold-Archimedean $T_d$ polyhedral.
Figure 12B:
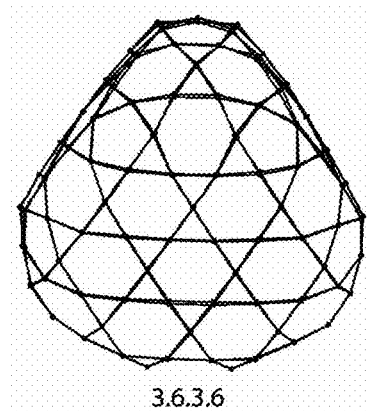
Figure 12C:
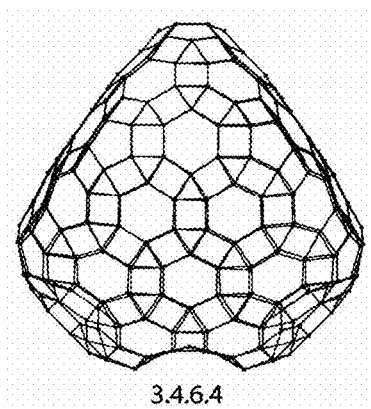
Figure 12D:
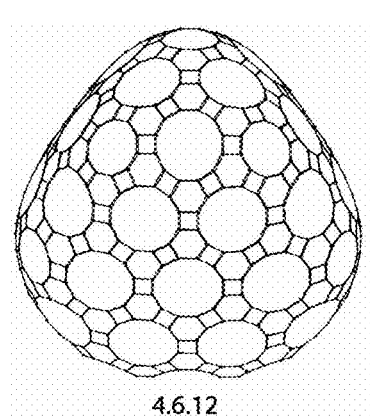
Figure 12E:
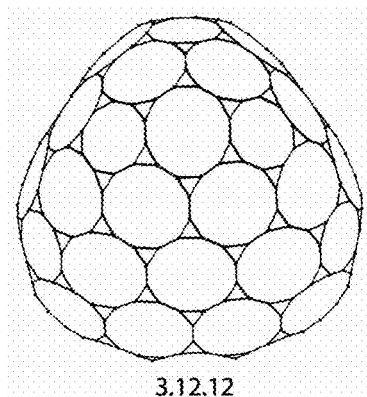

Applied to a 6.6.6 tiling, the "Fowler construction" cuts out three kinds of Triangular patches: a large equilateral Triangle, a small equilateral Triangle and three identical scalene Triangles, a total of five Triangles. Four copies of this group of 5 triangles, a total of 20, may be assembled to produce a tetrahedral 6.6.6 (fullerene) cage (with 3valent vertices, 6gons and twelve 5gons) with point group symmetry T, $T_d$ or $T_h$. FIG. 11E shows this arrangement of Triangular patches 520, including a large equilateral triangle 522 and triangles that are scalene 524. Each of Fowler's small equilateral Triangular patches 526 is split into three parts to show the tetrahedral nature—the "4-ness" and the symmetry—of this method.

The SGY construction is closely related to the Fowler construction but follows more restricted rules, as the three non-equilateral Triangular patches must be isosceles, the three isosceles triangles and the large equilateral triangle must together form a regular hexagon (FIG. 11A), and the outcome is just a subset of only the $T_d$ cages.

We apply the Fowler construction to the five 6fold Archimedean tilings (FIGS. 8A-8E) to produce an additional five new classes of cage: namely the Archimedean tetrahedral cages, corresponding one-for-one with all of the tetrahedral 6.6.6 fullerene cages, all of which may be produced by the Fowler construction. We transform many of these new cages into convex equilateral polyhedra as described above. We call these new classes the "tetrahedral-3.6.3.6" cages and polyhedra, the "tetrahedral-3.4.6.4" cages and polyhedra, etc.

X. Atlases of New Classes of 6Fold Cage, including Ones without Polyhedral (Icosahedral, Octahedral and Tetrahedral) Symmetry, Generated by the "Method of Replacement" or by the "Method of Truncations" from 6+5 (fullerene), 6+4 and 6+3 Cages.

A. Method of Replacement: Replacing Hexagons with Hexagonal (6Fold) Tiles and Smaller Faces with Reduced Tiles.

We first discuss cages related to fullerenes, which have v trivalent vertices, twelve 5gons and v/2-10 6gons, which here we call "6+5 cages." Fullerene cages are found with 28 point-group symmetries. Five of these point groups, I, $I_h$, T, $T_d$ and $T_h$ have "polyhedral symmetry" and are the subject of the sections above. The vast majority of fullerenes cages belong to the other 23 point groups with non-polyhedral symmetry. The method described below can produce both those with polyhedral symmetry and those without.

For each fullerene cage described above we make five corresponding Archimedean 6fold cages. We produce these by replacing each of the 6gons in the fullerene cage with one of the Archimedean hexagonal tiles (FIGS. 13A-13E) and replacing each of the 5gons with a tile reduced from the corresponding hexagonal tile (FIG. 14). In FIG. 14 a hexagonal 3.6.3.6 6fold tile is shown reduced to a pentagonal 3.5.3.5 tile, a square 3.4.3.4 tile and a triangular 3.3.3.3 tile.

Figure 13A:
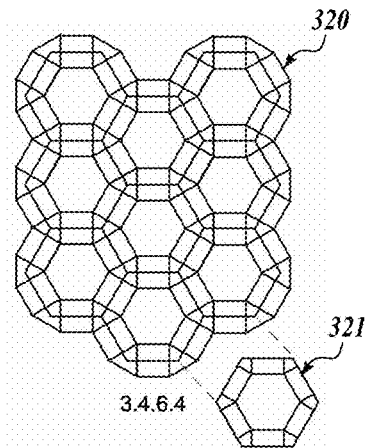
FIGS. 13A-13E illustrate 6fold-Archimedean tilings and tiles, wherein a 6.6.6 (hexagonal) tiling overlies the five Archimedean tilings with 6fold faces, and a corresponding isolated hexagonal 3.4.6.4, 3.6.3.6, 3.12.12, 4.6.12 and 3.3.3.3.6 tile for each tiling.
Figure 13B:
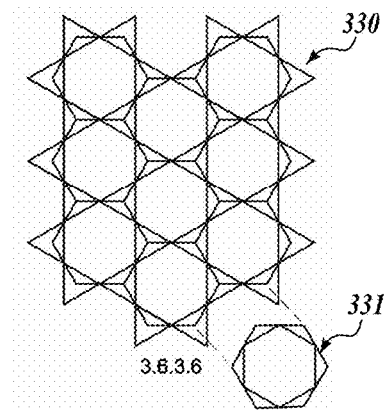
Figure 13C:
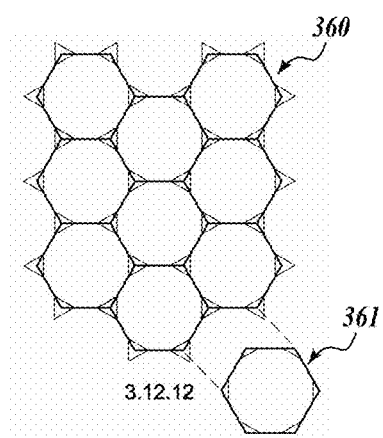
Figure 13D:
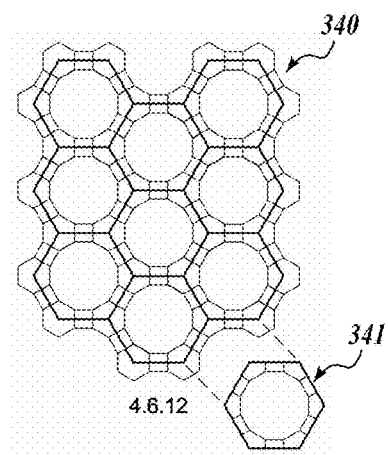
Figure 13E:
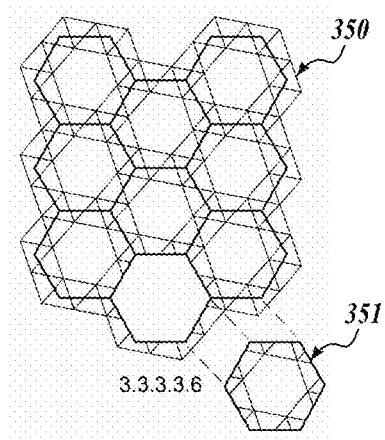
Figure 14:
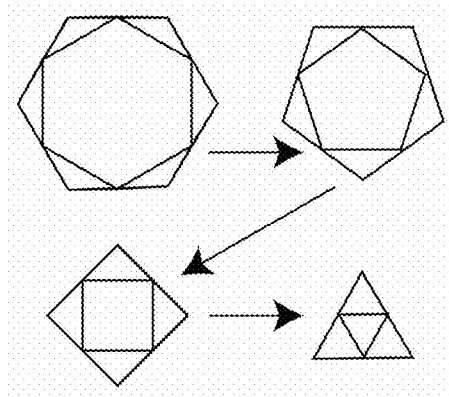
FIG. 14 illustrates reduction of a hexagonal 3.6.3.6 tile to a pentagonal 3.5.3.5 tile, a square 3.4.3.4 tile and a triangular 3.3.3.3 tile.

FIG. 13A shows the hexagonal tile 321 corresponding to the 3.4.6.4 uniform tiling 320. FIG. 13B shows the hexagonal tile 331 corresponding to the 3.6.3.6 uniform tiling. FIG. 13C shows the hexagonal tile 361 corresponding to the 3.12.12 uniform tiling. FIG. 13D shows the hexagonal tile 341 corresponding to the 4.6.12 uniform tiling. FIG. 13E shows the hexagonal tile 351 corresponding to the 3.3.3.3.6 uniform tiling.

The term "6+5 cages" used above refers to fullerene cages with v 3valent vertices, twelve 5gons and v/2-10 6gons. Similarly, the term "6+4 cages" refers to cages with v 3valent vertices, six 4gons and v/2-4 6gons, and the term "6+3 cages" to refer to cages with v 3valent vertices, four 3gons and v/2-2 6gons. We can therefore produce a new comprehensive atlas of 6+4 cages and another comprehensive atlas of 6+3 cages.

Each of the 6+4 and 6+3 cages may also be transformed into Archimedean 6fold cages by replacing each of the 6gons with one of the Archimedean hexagonal tiles (FIGS. 13A-13E) and replacing each of the 4gons (or 3gons) with a tile reduced from the corresponding hexagonal tile (FIG. 14). Thus, we replicate each of the 6+4 and the 6+3 cages five times, once for each of the five Archimedean 6fold tilings.

B. Truncation, Rectification, Cantellation, Cantitruncation and Snubbing of 6Fold Cages In another method, the 6.6.6 tiling (with edges of 1 unit) (FIGS. 13A-13E) are transformed into the five 6fold Archimedean tilings by truncation-related operations:

3.6.3.6. "Rectification" (truncation of vertices) in the 6.6.6 tiling by splitting edges halfway from each vertex, produces the equilateral 3.6.3.6 tiling. The edge length in the 3.6.3.6 tiling are equal to sqrt(3)/2=0.866025 compared to the length of 1 in the 6.6.6 tiling.

3.4.6.4. "Cantellation" (truncation of edges) in the 6.6.6 tiling produces the 3.4.6.4 tiling. The edge length in the 3.4.6.4 tiling are sqrt(3)/(1+sqrt(3))=0.633975 compared to the length of 1 in the 6.6.6 tiling. Therefore, the height of the truncation "box" must be 0.633975, giving a half height of 0.31699, less than half the distance to the neighboring vertex.

3.12.12. Truncation of vertices in the 6.6.6 tiling produces the 3.12.12 tiling. The edge length in the 3.12.12 tiling are 1-2/(2+sqrt(3))=0.4641 long compared to the length of 1 in the 6.6.6 tiling. Therefore, edges in the 6.6.6 tiling must be split at a distance of 1/(2+sqrt(3))=0.26795 from each vertex, less than half of the distance to the neighboring vertex.

4.6.12. "Cantitruncation" (truncation of vertices and edges, also called Omnitruncation) in the 6.6.6 tiling (with edges of 1 unit) produces smaller hexagons and 3 vertices for each original 6.6.6 vertex, along with following connection of each new triplet of vertices to form an equilateral triangle. The new edge lengths are sqrt(3)/(1+sqrt(3))=0.6339746, which is more than half as large as the original edges.

3.3.3.3.6. "Snubbing" in the 6.6.6 tiling produces the chiral 3.3.3.3.6 tiling.

As above, for each and every fullerene cage described above we can make the five corresponding Archimedean 6fold cages by these truncation operations. Thus, we generate new cages corresponding to the comprehensive Atlas of Fullerenes five times, once for each of the five Archimedean 6fold tilings, by this method as well.

XI. Atlases of 4Fold 4Valent Cages, including Ones without Polyhedral Symmetry, Generated with 4Fold Archimedean Tiles from 4Valent 4+3 Cages by the Method of Replacement.

Similarly, we create an "Atlas of Squarenes" based on a 4.4.4.4 tiling. With v 4valent vertices, eight 3gons and v-6 4gons, the squarenes may also be called 4+3 4valent cages, or just 4+3 cages for short.

Figure 15C:
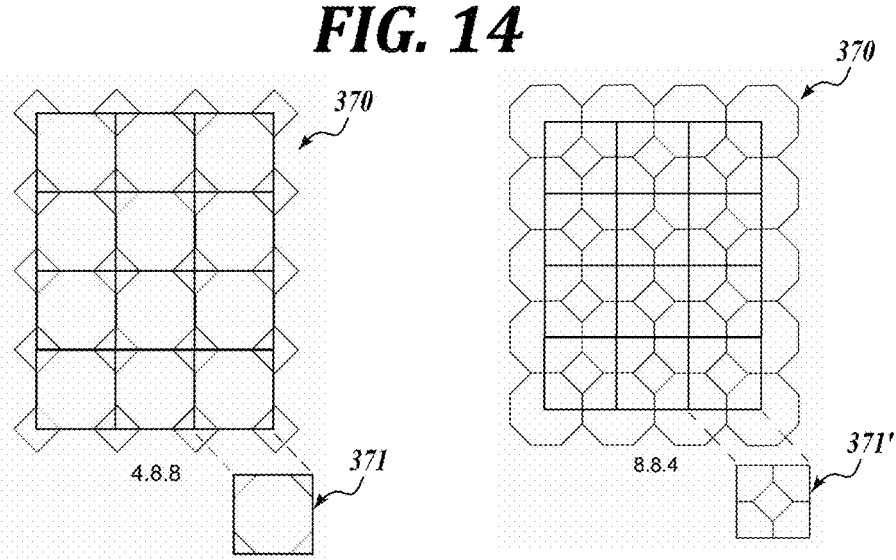
Figure 15C:
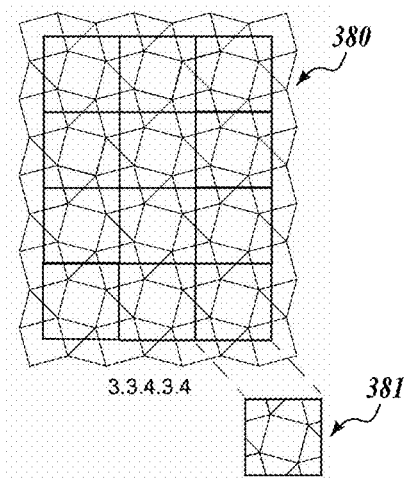
Figure 16:
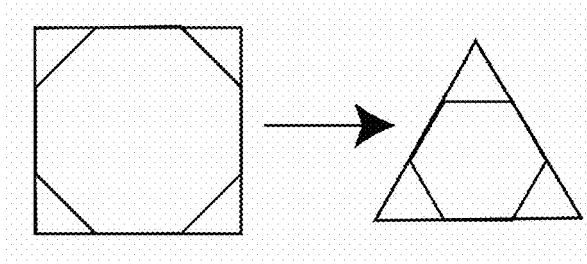
FIG. 16 illustrates reduction of a square 4.8.8 tile to a triangular 4.6.6 tile.

We also produce 4fold Archimedean cages, one-for-one from each squarene. As above, we provide two methods, Replacement and Truncation:

Method #1 (Replacement): The Atlas of Squarenes can be replicated to produce three new classes of 4fold-Archimedean (4.8.8, 8.8.4 and 3.3.4.3.4) cage by the method of replacement of squares with square Archimedean tiles (FIGS. 15A-15C) and of triangles with tiles reduced from those square tiles (FIG. 16).

FIG. 15A shows one hexagonal tile 371 corresponding to the 4.8.8 uniform tiling 370. FIG. 15B shows another hexagonal tile 371' corresponding to the 8.8.4 uniform tiling 370 (which is the same as the 4.8.8 uniform tiling). FIG. 14C shows the hexagonal tile 381 corresponding to the 3.3.4.3.4 uniform tiling 380.

Method #2 (Truncation): The Atlas of Squarenes can also be replicated by the method of truncation of squarene cages. We first discuss three relationships between the 4.4.4.4 tiling and the two 4fold Archimedean tilings. The 4.4.4.4 tiling (with edges of 1 unit) may be transformed into these tilings by truncation operations (FIG. 16):

4.8.8. Truncation of vertices in the 4.4.4.4 tiling (with edges of unit length) produces the 4.8.8 tiling. The edge length in the 4.8.8 tiling are sqrt(2)−1=0.41421 long compared to the length of 1 in the 4.4.4.4 tiling. Therefore edges in the 4.4.4.4 tiling must be split at a distance of 1−sqrt(2)/2=0.29289 from each vertex, less than half of the distance to the neighboring vertex.

8.8.4. Truncation of vertices in the 4.4.4.4 tiling (with edges of unit length) produces the 8.8.4 tiling, which is the same as the 4.8.8 tiling. The edge length in the 8.8.4 tiling are sqrt(2)−1=0.41421 long compared to the length of 1 in the 4.4.4.4 tiling. Therefore edges in the 4.4.4.4 tiling must be split at a distance of sqrt(2)/2=0.70711 from each vertex, more than half of the distance to the neighboring vertex.

3.3.3.3.4. Snubbing of the 4.4.4.4 tiling produces the chiral 3.3.3.3.4 tiling.

Each 4fold Archimedean cage or its Schlegel diagram may be produced by one of these operations, again using the qualitative instructions (less than halfway or halfway). In addition, we apply our planarization methods to produce new convex equilateral polyhedra for some of these cages.

Above we described production of squarene and Archimedean cages with octahedral symmetry. Here, the 4fold-Archimedean cages that have non-polyhedral symmetry in these three new Atlases are novel. Again, we apply our planarization methods to produce new convex equilateral polyhedra (with planar faces) for some of these cages that populate the new 4fold Atlases.

XII. Placing 5Fold Tiles (Reduced from 6Fold) on the Dodecahedron and 4Fold Tiles (Reduced from 6Fold) on a Cube As described above, we produce 5fold tiles by reducing Archimedean 6fold tiles (FIG. 14). We make five of these tiles, one for each of the five 6fold Archimedean tilings. We then place each of the five new 5fold tiles onto the facets of a dodecahedron to produce five new cages. Some of these cages can be planarized to become polyhedra.

Similarly, we produce five new 4fold tiles by reducing the five 6fold Archimedean tiles (FIG. 16). By application of each type of tile to the faces of a cube, we produce five new cages, and some of these can be planarized to produce new polyhedra.

XIII Nanotubes

A. Platonic 6Fold Nanotubes

Certain 6.6.6 nanotubes can be capped with half of a Platonic polyhedron (e.g., a dodecahedron) or an Archimedean polyhedron. For example, the 5,5 and 9,0 (6.6.6) nanotubes may each be capped by half of the Archimedean polyhedron called the truncated icosahedron, the first centered on a pentagon, the second on a hexagon.

B. Archimedean 6Fold Nanotubes

Moreover, we create five new classes of nanotube (with indices n,0 (zigzag), n,n (armchair) and n,m (chiral)), each by rolling up a sheet composed of one of the five 6fold Archimedean tilings (FIGS. 8A-8E). Equivalently, we can create these new classes by replacing the 6gons in the 6.6.6 nanotubes with hexagonal tiles from each of the five Archimedean tilings (FIGS. 13A-13E).

Certain of the Archimedean nanotubes may be capped with half of an Archimedean polyhedron. For example, the 5,5 and 9,0 3.6.3.6 nanotubes can be capped by half of an icosidodecahedron, the first (5,5) centered on a pentagon, the second (9,0) on a triangle.

C. Archimedean 4Fold Nanotubes

Figure 17A:
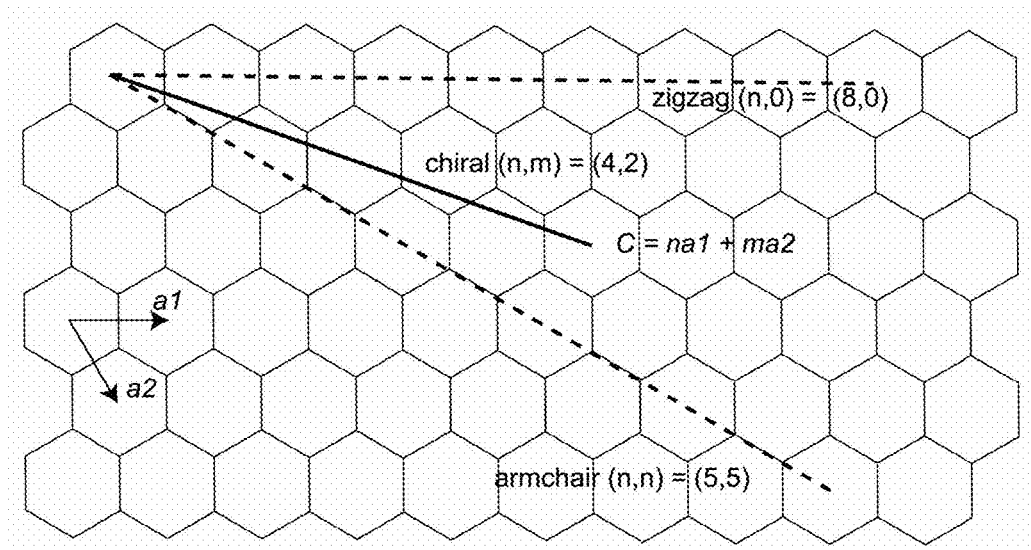
Figure 17B:
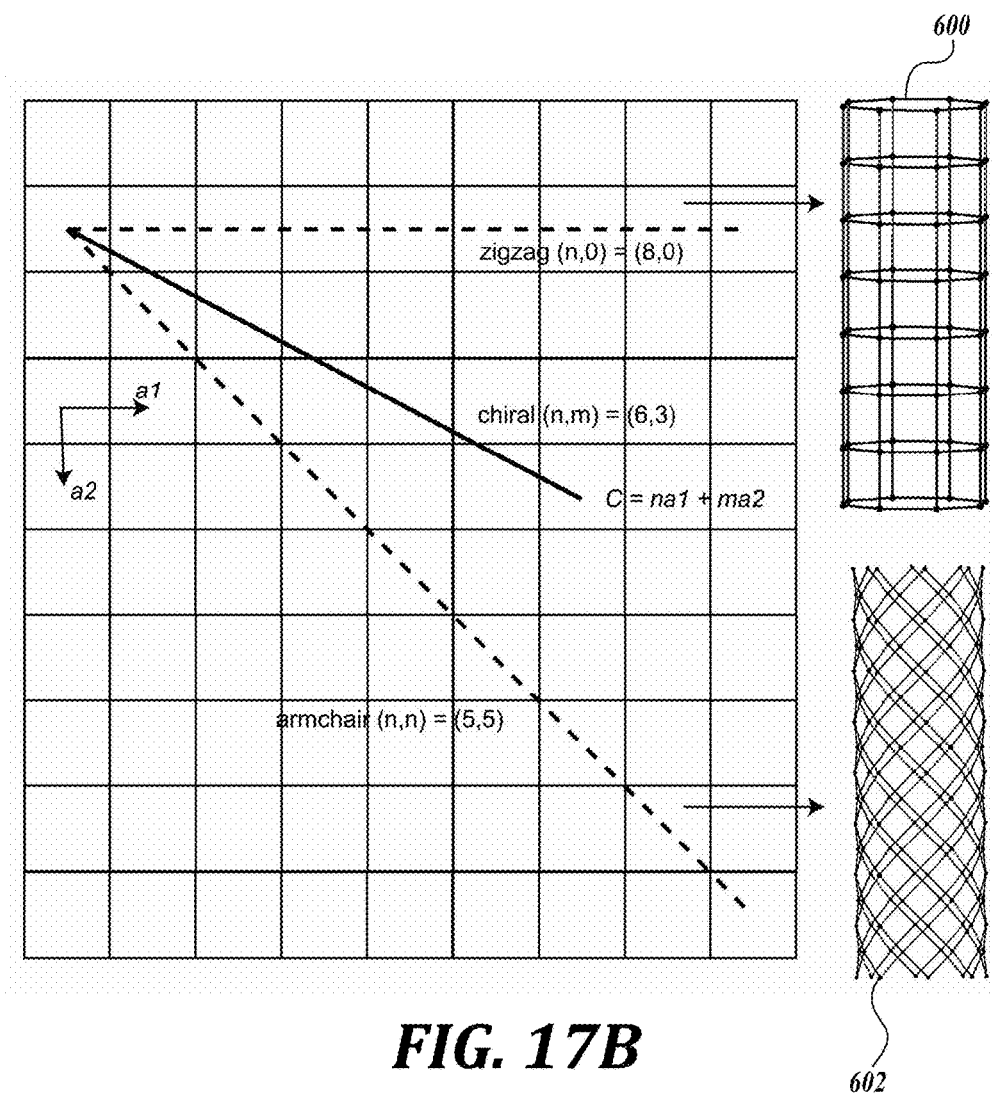

Similarly, depending on how a sheet composed of a 4.4.4.4 tiling is rolled up, there are three types of standard 4fold 4.4.4.4 nanotube, n,0 (zigzag); n,n (armchair); and n,m (chiral) (C in FIG. 17B). Correspondingly, we create two new classes of Archimedean 4fold nanotube 600, 602, each by rolling up a sheet composed of a 4fold (4.8.8 or 3.3.3.4.4) Archimedean tiling (FIGS. 9A-9C). Equivalently, we replace the 4gons in these 4.4.4.4 nanotubes with square tiles from each of the two 4fold Archimedean tilings (FIGS. 15A-15C).

Certain of the Archimedean nanotubes may be capped with half of an Archimedean polyhedron. For example, the 5,5 and 9,0 3.6.3.6 nanotubes can be capped by half of an icosidodecahedron, the first (5,5) centered on a pentagon, the second (9,0) on a triangle.

While exemplary embodiments have been illustrated and described, it will be appreciated that various changes can be made therein without departing from the spirit and scope of the invention.

The embodiments of the invention in which an exclusive property or privilege is claimed are defined as follows:

1. A method of defining a convex equilateral cage comprising:
    selecting an initial cage comprising a plurality of edges extending from vertices, wherein the edges define a plurality of faces;
    defining a secondary cage comprising edges and vertices from a plurality of tiles, reduced tiles, or larger patches obtained or derived from a selected one of the uniform Archimedean tilings, wherein the plurality of tiles, reduced tiles, or patches are positioned over the plurality of faces of the initial cage;
    resizing at least some of the edges of the secondary cage such that all of the edges of the secondary cage have the same length, the resized cage defining a plurality of polygons, wherein at least some of the plurality of polygons are not planar;
    solving for a set of interior angles for the plurality of polygons that transforms the plurality of polygons to be planar or solving for a set of vertex coordinates for the plurality of polygons that transforms the plurality of polygons to be planar; and
    constructing a convex equilateral cage structure comprising members defining edges having the same length and oriented according to the set of interior angles or the set of vertex coordinates.

2. The method of claim 1, wherein the initial cage comprises one of a tetrahedral cage, an octahedral cage, an icosahedral cage, and a hexahedral cage.

3. The method of claim 1, wherein the plurality of tiles, reduced tiles, or larger patches comprise Archimedean tiles obtained from an Archimedean uniform tiling.

4. The method of claim 1, wherein the plurality of tiles, reduced tiles, or larger patches consist of a plurality of tiles from a selected Archimedean uniform tiling and a plurality of reduced tiles derived from the tiles from the selected Archimedean uniform tiling.

\* \* \* \* \*